(12) United States Patent
Hibbs-Brenner et al.

(10) Patent No.: US 6,404,960 B1
(45) Date of Patent: Jun. 11, 2002

(54) FLEXIBLE OPTIC CONNECTOR ASSEMBLY

(75) Inventors: Mary K. Hibbs-Brenner, Plymouth, MN (US); Harold Y. Walker, Jr., Plano, TX (US); Julian P. G. Bristow, Lakeville; Yue Liu, Plymouth, both of MN (US)

(73) Assignee: Honeywell Inc., Morristown, NJ (US)

( * ) Notice: Subject to any disclaimer, the term of this patent is extended or adjusted under 35 U.S.C. 154(b) by 0 days.

(21) Appl. No.: 09/268,191

(22) Filed: Mar. 15, 1999

Related U.S. Application Data

(63) Continuation-in-part of application No. 08/775,330, filed on Dec. 31, 1996, now abandoned.

(51) Int. Cl.[7] .............................. G02B 6/30; G02B 6/42
(52) U.S. Cl. .............................. 385/52; 385/49; 385/51; 385/88
(58) Field of Search .............................. 385/14, 49, 50, 385/51, 52, 88, 89, 90, 129–133

(56) References Cited

U.S. PATENT DOCUMENTS

| | | | | |
|---|---|---|---|---|
| 5,375,184 A | * | 12/1994 | Sullivan | 385/129 |
| 5,774,614 A | * | 6/1998 | Gilliland et al. | 385/88 |
| 5,974,214 A | * | 10/1999 | Shacklette et al. | 385/50 |
| 6,045,269 A | * | 4/2000 | Watanabe et al. | 385/59 |
| 6,088,498 A | * | 7/2000 | Hibbs-Brenner et al. | 385/52 |

OTHER PUBLICATIONS

Hsu et al, "Flip–Chip Approach To Endfire Coupling Between Single–Mode Optical Fibres And Channel Waveguides", Electronics Letters, vol. 12, No. 16, Aug. 5, 1976, pp. 404–405, Aug. 1976.*

* cited by examiner

*Primary Examiner*—John D. Lee
(74) *Attorney, Agent, or Firm*—Andrew A. Abeyta; Kris T. Frederick; John G. Shudy, Jr.

(57) ABSTRACT

A self-aligned optical coupler, and method of manufacturing thereof, for conducting light from and to vertical and/or horizontal ports on optical devices or optoelectric integrated circuits. The device or circuit having the respective port has keys and/or slots on the device or circuit for self-aligning an end of the optical coupler to the port. The end has corresponding slots and/or keys. Visual alignment marks may be used instead so as to permit automatic alignment with machine vision devices. The coupler may have one or a plurality of waveguides. One of the ends of the coupler may have a connector for a self-aligning optical connection to a connector receptacle of a module or a backplane.

12 Claims, 26 Drawing Sheets

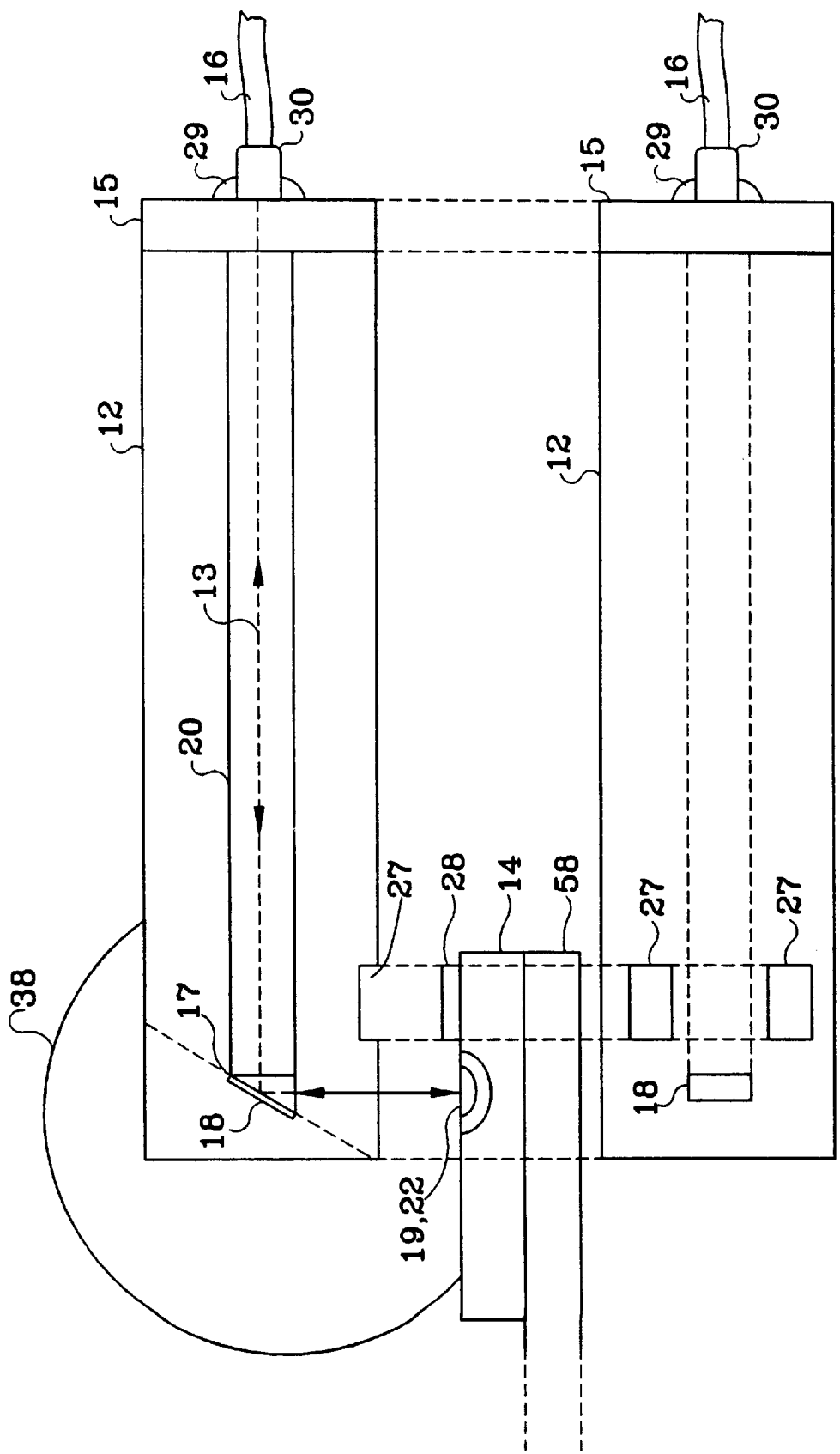

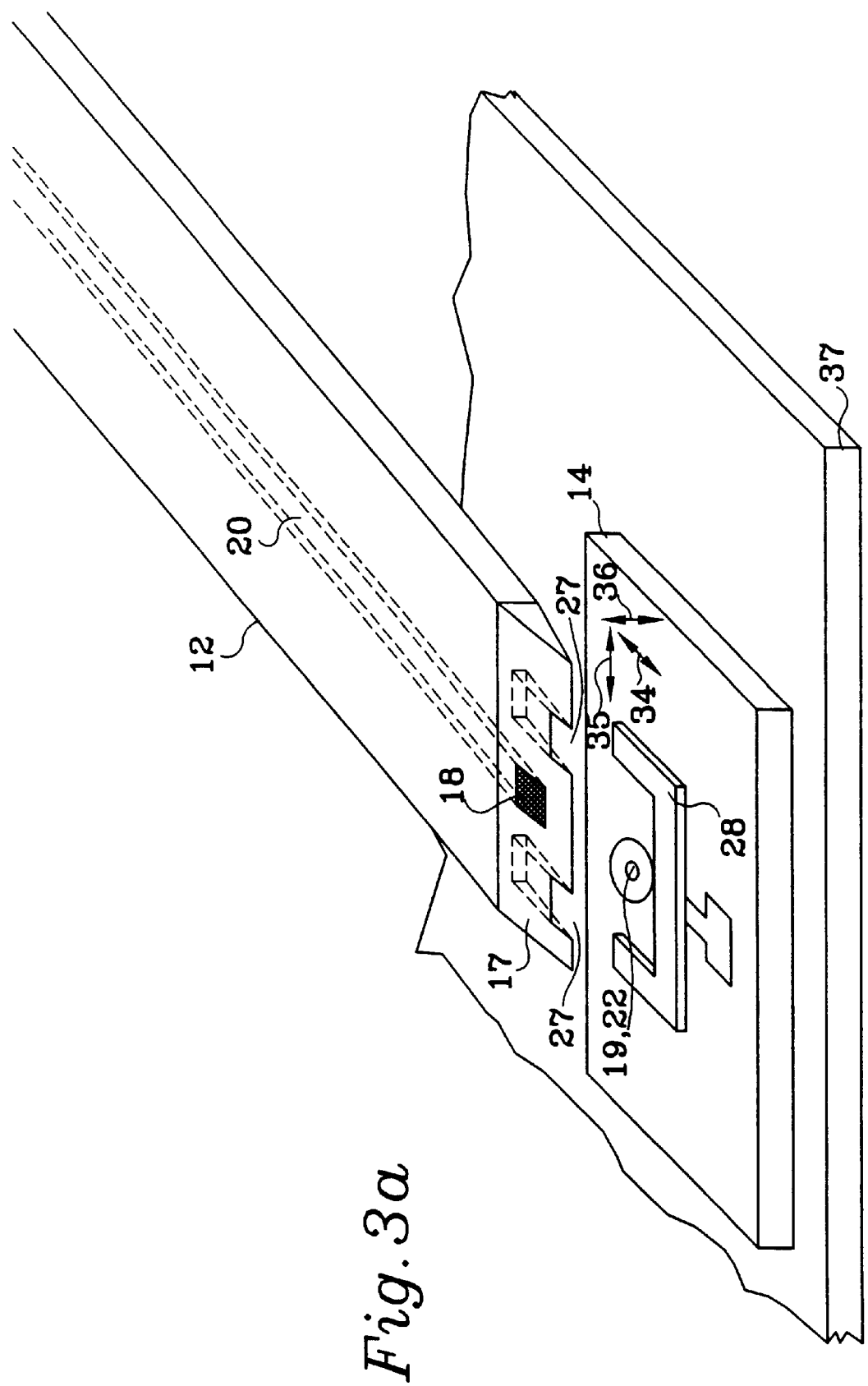

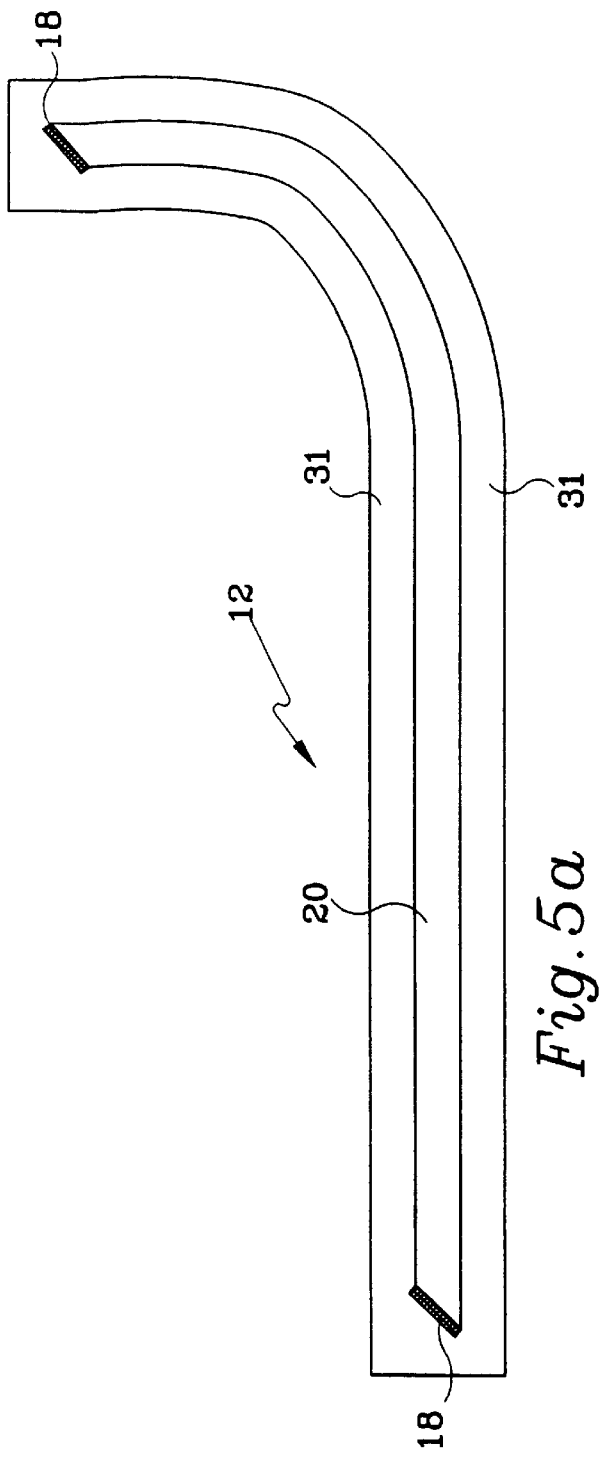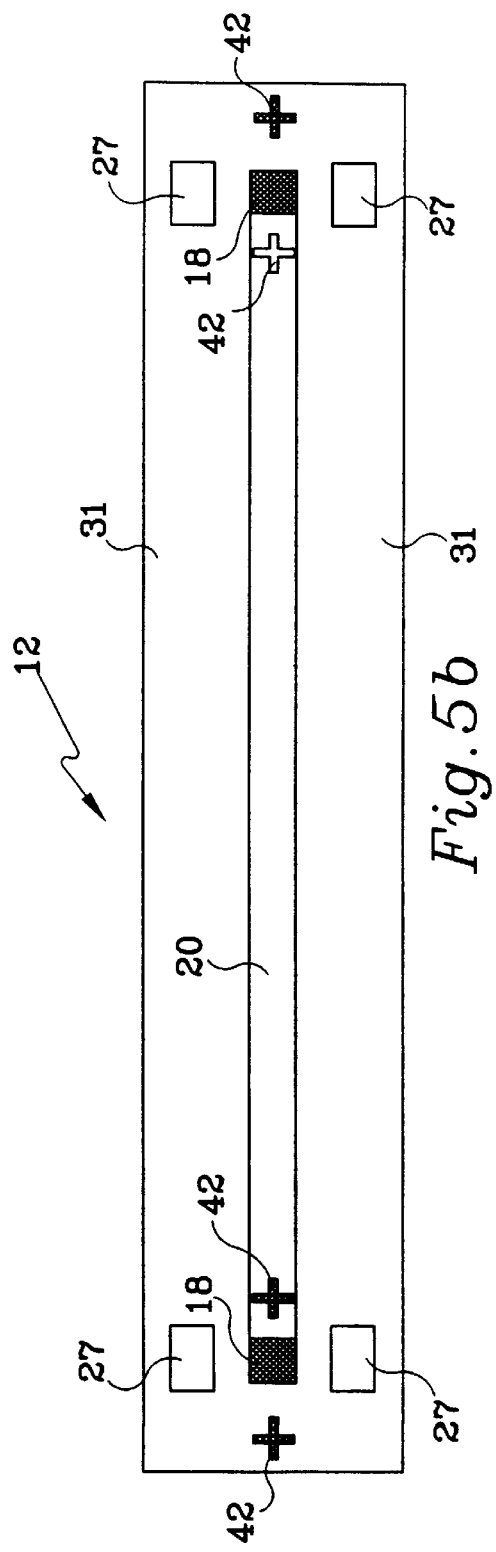

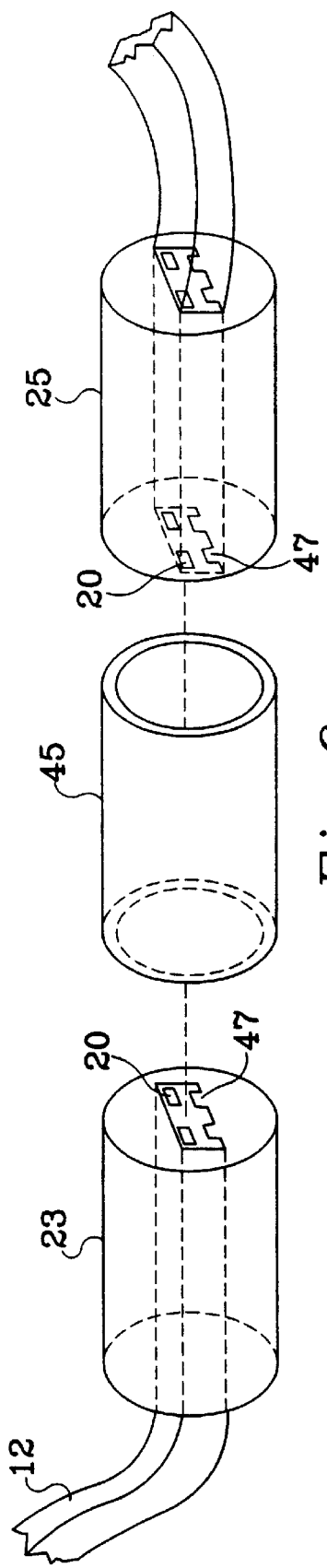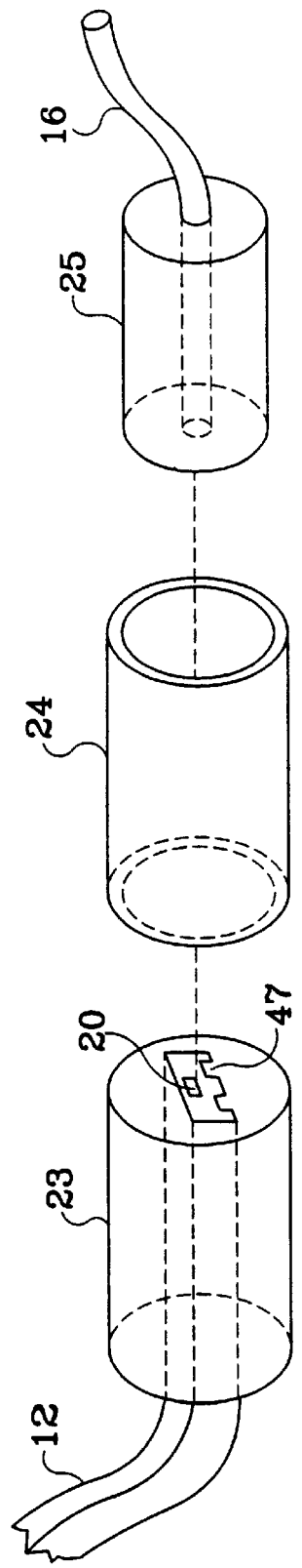

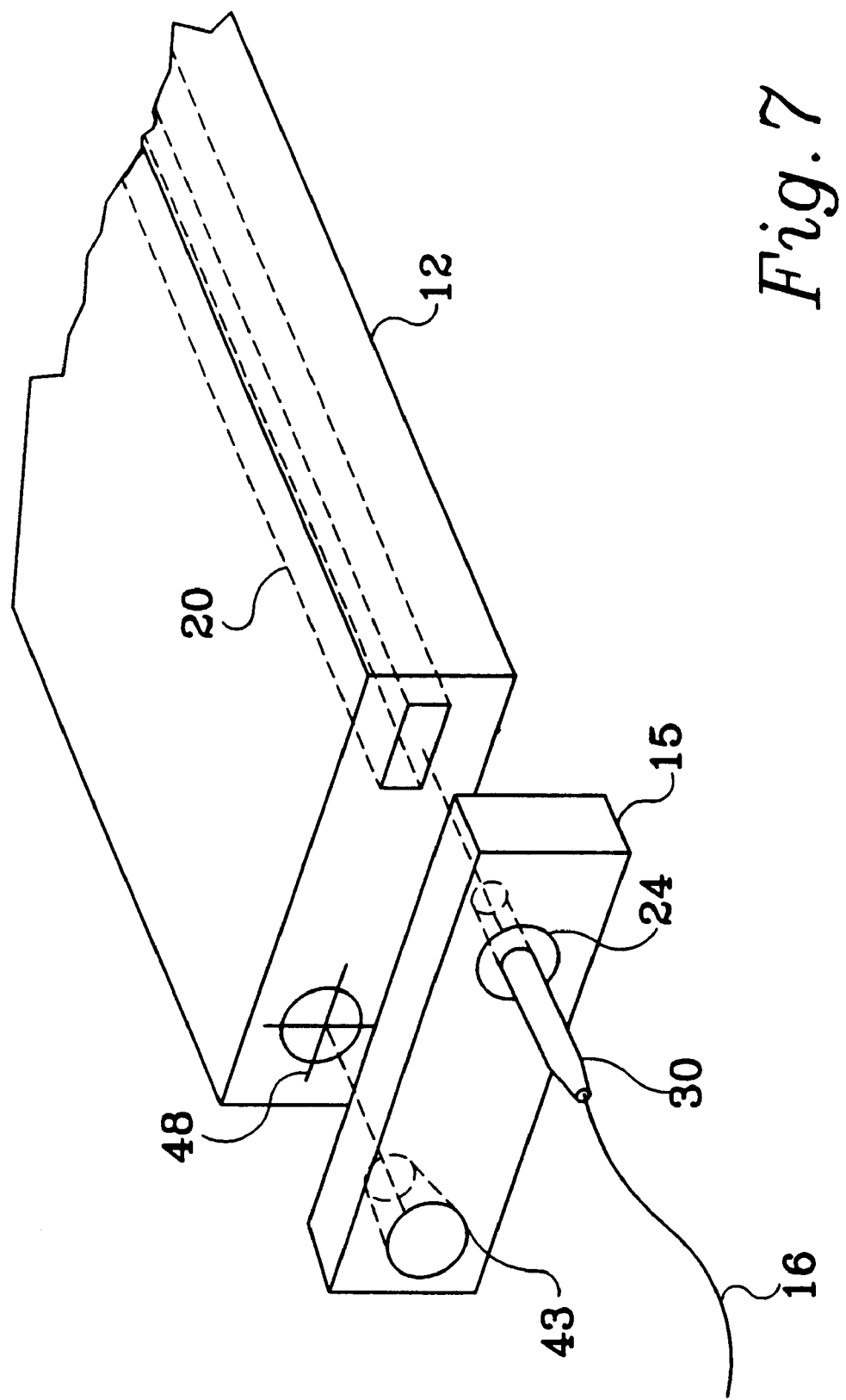

FLEXIBLE OPTIC CONNECTOR ASSEMBLY

This application is a continuation-in-part of application Ser. No. 08/775,330, filed on Dec. 31, 1996 (abandoned).

The U.S. Government may have rights in the present invention.

BACKGROUND OF THE INVENTION

The invention pertains to optical connectors and particularly to optical connectors making use of flexible connectors. More specifically, this invention pertains to the use of self-aligned, flexible optical connectors for coupling light between an optoelectronic device and an optical fiber, waveguide, or arrays of devices, fibers, and/or waveguides and a method of manufacture thereof.

A common problem is to simultaneously provide electrical connection to an optoelectronic device as well as optical coupling from the device to an optical fiber in a connected package. Previous methods of such coupling have included placing the device in a first level package, such as a TO header in an optical connector receptacle, rather than placing the device directly on the circuit board providing an electrical connection from the circuit board to the TO header by means of an electrical flex circuit. This approach involves costly and time consuming methods of manufacturing.

U.S. Pat. No. 5,375,184 ('184 patent) by inventor Charles T. Sullivan and issued Dec. 20, 1994, hereby incorporated by reference in this specification, appears to disclose 1) self-aligning mechanical approach for lateral waveguide to lateral waveguide alignment; 2) the use of visual alignment marks for lateral waveguide to lateral waveguide alignment or the alignment of a vertical port to a waveguide with a 45 degree facet; and 3) a coupling approach having alignment, but not for vertically coupled optical ports such as photodetectors, vertical cavity surface emitting lasers (VCSELs), or surface emitting light emitting diodes (LEDs). The alignment marks of the '184 patent for use with a vertically coupled optical port still require manual alignment which is not self-aligning. This patent also does not deal with the approach for coupling between a flexible optical waveguide and an optical fiber waveguide within the connector receptacle.

SUMMARY OF THE INVENTION

The present invention has self-aligning features for waveguide self-alignment to a vertically coupled optical port such as a photodetector, VCSEL, or surface emitting LED. The invention also includes self-aligning or passively aligned structures for connector receptacles and backplanes. While the optical devices or optoelectronic integrated circuits are still at the wafer level, the wafer is coated and photolithographically patterned to provide the self-aligning features. Specifically, a pillar of dielectric or polymer material on the photodetector or laser wafer is fabricated in a fashion such that it fits or snaps into a recess of the waveguide thus providing a passive alignment with an accuracy of better than 5 micrometers ($\mu$m). The added feature of this is the holding of the waveguide in place after the aligning fixtures are removed.

The features of the present invention include a self-aligning approach for coupling a waveguide or a plurality of waveguides to a vertically coupled device or devices, which can then be mounted directly onto a circuit board with other chips, without a first level package, and for connecting the other ends of the waveguides or connectors into optical connector receptacles of a module or a backplane.

The features of this approach include an optical waveguide or array of waveguides, that optically connect an optical device or devices at one end to a connector/connector receptacle at the other end. Self-aligning mechanical features provide 1 to 5 $\mu$m alignment tolerances at the optical chip, while mechanical or visual alignment marks allow accurate placement of the waveguide in the connector receptacle at the other end, allowing automatic alignment to take place with machine vision.

BRIEF DESCRIPTION OF THE DRAWING

FIGS. 1a and 1b illustrate a self-alignment mechanism between a flexible coupler and a circuit board having a vertical light port.

FIGS. 3a and 3b illustrate alignment grooves and ridges of a flexible-coupler-to-board connection.

FIGS. 5a and 5b reveal the structure of the flexible waveguide having two forty-five degree facet ends.

FIGS. 6a, 6b, 6c, 6d, 6e and 6f illustrate various connections of two flexible light waveguides/fibers.

FIG. 7 illustrates an alternative approach for aligning the waveguide structure at the connector receptacle end.

DESCRIPTION OF THE SPECIFIC EMBODIMENTS

Figure 1A:
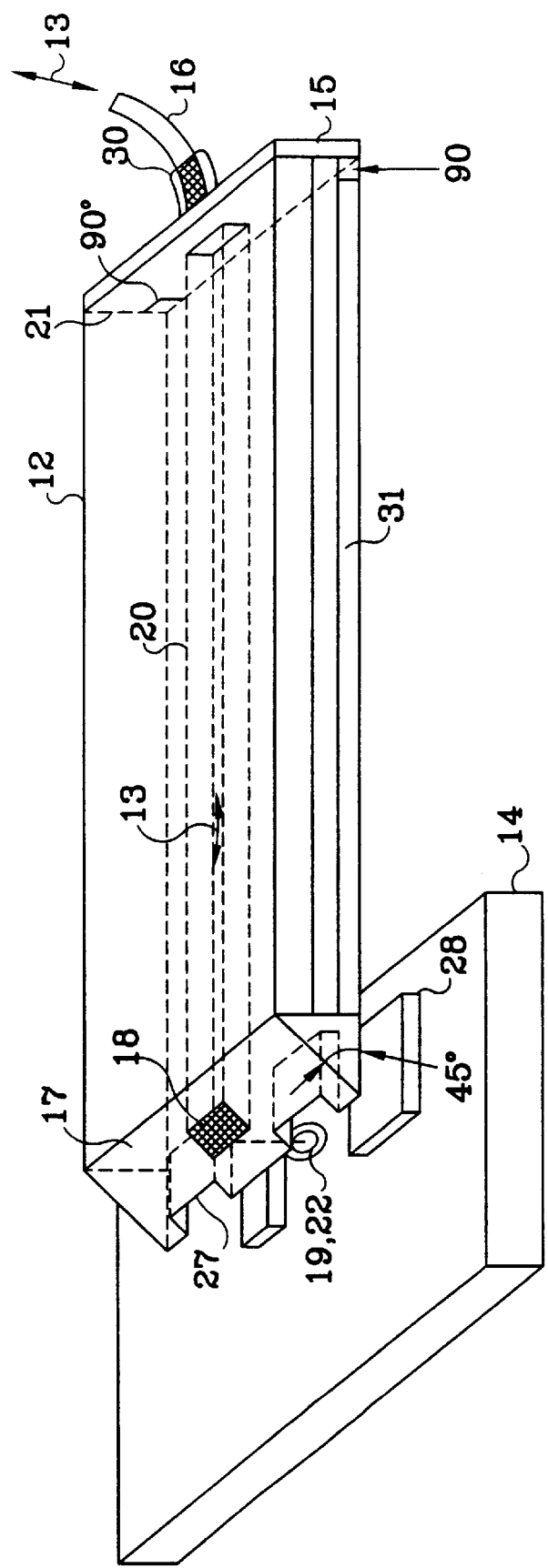

A polymer waveguide structure 12 (FIG. 1a) is used to guide light 13 to/from optical chip 14 through flexible optical circuit 12 and connector receptacle 15 and into fiber 16 which is centered with respect to connector receptacle 15 by ferrule 30. Flex circuit 12 containing waveguide 20 can be constructed from a variety of materials. One example is an ULTEM defined waveguide circuit 12 with BCB cladding polymer layers 31. A two dimensional sheet of waveguide flex circuit structures can be fabricated as will be described below, and then the individual flex circuits 12 may be separated by sawing or cutting. In the embodiment shown in FIG. 1a, a perpendicular cut 21 at one end is used where waveguide 12 couples to fiber 16 via connector receptacle 15 and ferrule 30. At the other end of the optical flex circuit 12, a 45-degree cut 17 is made to form a turning mirror 18 to direct light out of laser 19 and into waveguide 20, or out of waveguide 20 and into a photodetector 22.

The present invention adapts the self-aligning waveguide technology to enable an optical chip 14 on-board packaging approach for modules and backplanes. An optical chip 14 containing a light source 19 or detector 22, can be placed directly on a board 58, with the light coupled in or out of the port 19, 22, through waveguide 20, as noted in FIG. 1b. Although not shown in the figure, this board 58 would also contain laser driver or receiver amplification I.C.s as discrete components. The use of a metalized 45-degree reflector 18

(in FIG. 1a) then allows device 12 to be covered with glob top 38 (a covering of protective dark epoxy) without affecting the optical properties. The other end of waveguide 20 is coupled into a connector receptacle 15 which accepts a ferrule 30 containing a fiber 16 which fits with precision inside receptacle 15, and, as a result, is precisely aligned to waveguide 20. There is a connector receptacle 15 holding onto both device 12 and fiber ferrule 30. The same approach described here can be used to couple two waveguides together at a board to backplane interface, for instance, as shown in FIG. 2b.

Figure 2A:
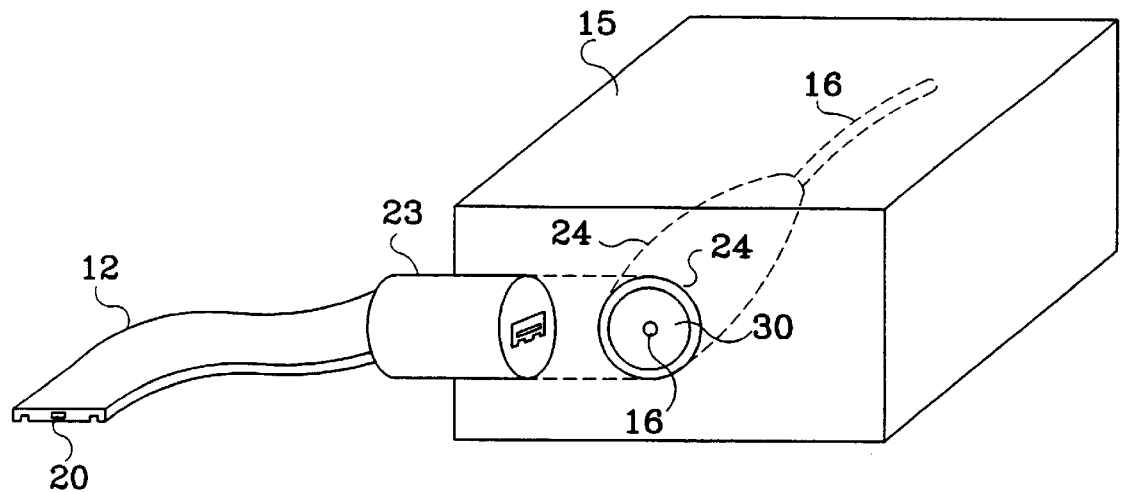
FIGS. 2a and 2b show a plug and receptacle connection of flexible couplers.
Figure 2B:
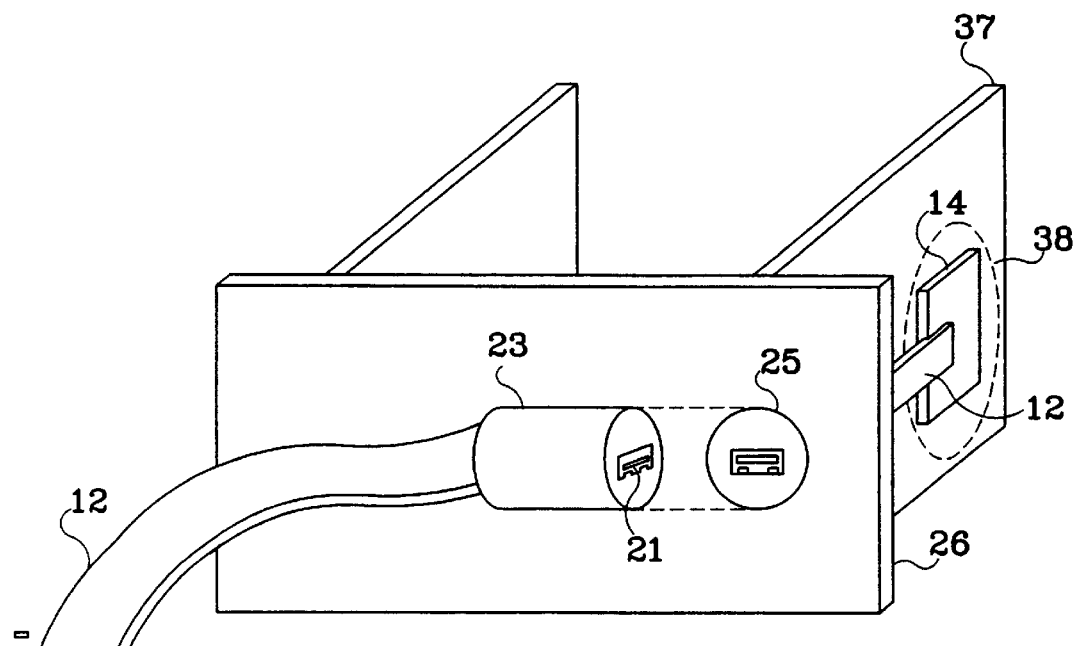

FIG. 2a shows the parallel waveguide flexible connector/interface 12 used to provide a rugged interface between a package or multichip module containing an optoelectronic die, and a connectorized optical fiber 16 which provides an interconnect path to the next module, board, or cabinet, via connector receptacle 23, connector 24 and ferrule 30.

Figure 3B:
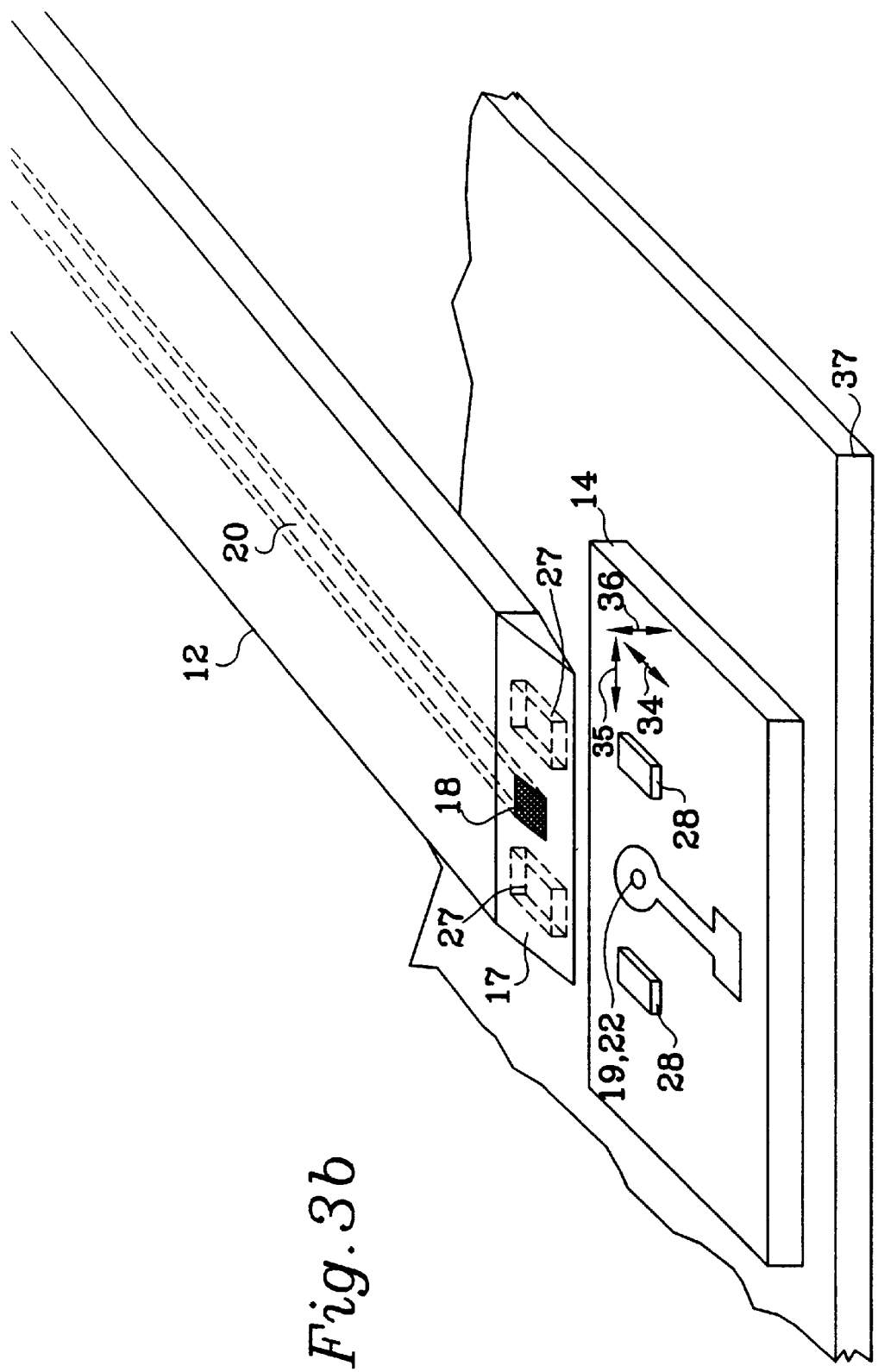

In order to passively align optical flex circuit 12 to an optical chip 14, locking structures 27 and 28 are defined in both optical flex circuit 12 and on top of optical chip 14, respectively. FIG. 1a and 1b show examples of waveguide-to-chip passive mechanical alignments. Grooves 27 are etched into optical flex circuit 12 as illustrated in FIGS. 3a and 3b. A matching alignment ridge 28 is formed on the surface near laser 19 or photodetector 22 on chip 14, by depositing and patterning an additional thick polymer layer on the surface of the chip. The polymer optical flex circuit contains both waveguide 20 for guiding the optical signal, and alignment wells 27. End 17 of optical flex circuit 12 which is coupled to the optical chip 14 is cut or sawed at a 45-degree angle 17. Alignment wells 27 in the optical flex circuit 12 are then snapped into place on top of ridges 28 on the laser 19 or photodetector 22 chip. This can be designed as two tracks so that the optical flex circuit 12 can be slid over chip 14 until turning mirror 18 is properly placed over optical device 19 such as a VCSEL. Ridges 28 and slots 27 provide alignment in lateral directions 34 and 35. The top surface of chip 14 and the bottom surface of flex circuit 12 provide alignment in vertical direction 36.

Alignment ridges 28 can be photolithographically defined at the wafer level during fabrication of lasers 19 and photodetectors/receivers 22, so that the fabrication can be very cost effective. Optical flex circuit 12 is multiply fabricated in large sheets, and then sawed into individual circuits 12 (with both 90-degree 21 and 45-degree 17 facets for mirrors 18), respectively, much as one saws up a wafer in the art. The fabrication of optical flex circuit 12 uses integrated circuit (IC) type manufacturing processes. The surface of 45-degree turning mirror 18 on optical flex circuit 12 is coated with gold or gold-titanium so that the reflectivity of turning mirror 18 is insensitive to the refractive index of the medium placed in contact with this mirror.

Similar self-aligning structures 27 are fabricated in optical flex circuit 12 to match alignment structures 28 in connector receptacle 15, so that flex circuit 12 is passively aligned for coupling from waveguides 20 to fibers 16 or other waveguides 20 in flex circuits 12 plugged into connector receptacle 15, 24 or 25. This is illustrated in FIGS. 1a, 1b, 2a and 2b.

The assembly of the optical components onto a printed circuit board 37 includes optical chips 14 being mounted onto board 37 using standard pick and place and surface mount techniques (FIG. 2b). For example, in current manufacturing processes, board 37 is stenciled with epoxy, chips 14 are placed on board 37, and an anneal step fastens the chips to board 37. The sheet of optical flex circuits 12 is cut into individual pieces, in one embodiment, each with a 90-degree facet 21 and a 45-degree facet 17 or with two 45-degree facets 17. Part of the 45-degree facets 17 are all metalized into mirrors 18 in a single batch metallization step. Optical flex circuit 12 can then be snapped onto the optical chips 14 and slid into place so 45-degree facet 17 with mirror 18 is properly located over the top of vertical port optical devices 19 and 22 on chip 14. The other end 21 of the optical flex circuit 12 having slots 27 may be slotted or threaded for sliding into connector receptacle 15 having ribs 28. This provides alignment to a fiber in a mating ferrule 30, or to another waveguide in a mating ferrule 25 in FIG. 2b.

Electrical wire bonding is performed to the optical chips 14 as well as the other I.C.s on board 37, and then an encapsulation step can be carried out such as depositing a "glob top" or dark epoxy covering 38 (in FIG. 2b) over all the chips 14. Since waveguide 12 turning mirror 18 is metalized, the use of glob top 38 provides mechanical and moisture protection for chips 14, without affecting the coupling efficiency from optical devices 19 and 22 to optical flex circuit 12 (illustrated in more detail in FIGS. 1a, 1b, 3a and 3b).

Features of the self-aligning interface are simple fabrication, no critical alignment steps required, no special training needed for optical component assembly because of self-aligning parts, low optical waveguide connection loss (i.e., 0.6 dB), permanent or temporary integration with an appropriate adhesive, and versatility wherein the self-aligning interface can be used to connect polymer waveguides 12 or optical fibers 16 to optoelectronic devices 19 and 22 packaged within multichip modules, hybrids, conventional packages or chip-on-board technology.

This description builds on the above-noted items to implement a chip-on-board connector. The invention includes a method for packaging either a serial or parallel optoelectronic module with optical chips 14, i.e., having laser 19 and photodetector/receiver 22 devices, mounted directly on printed circuit board 37. The method is for coupling light out of the laser 19, through a connector receptacle 24 and plug 23 and into fiber 16, as well as from fiber 16 into the photodetector/receiver 22.

This invention extends an adaptation for passive alignment to optical chips 14. This invention allows the optical chips 14 to be placed on the printed circuit board 37 rather than in first level packages such as TO headers. This approach provides both cost and speed advantages. Speed advantages occur because one can eliminate the leads from the package, such as those one typically finds in TO headers. These leads give rise to resonances which limit the ultimate package speed. This limit is around one gigahertz (GHz) for a TO 5.6 millimeter (mm) package. The flexible waveguide self-aligning interconnection also provides cost advantages by eliminating the first level package, allowing the optical chips 14 to be attached to board 37 at the same time as all the other I.C.s, and eliminating the need for an active optical alignment and soldering of a TO header with respect to the connector receptacle 24.

Figure 4:
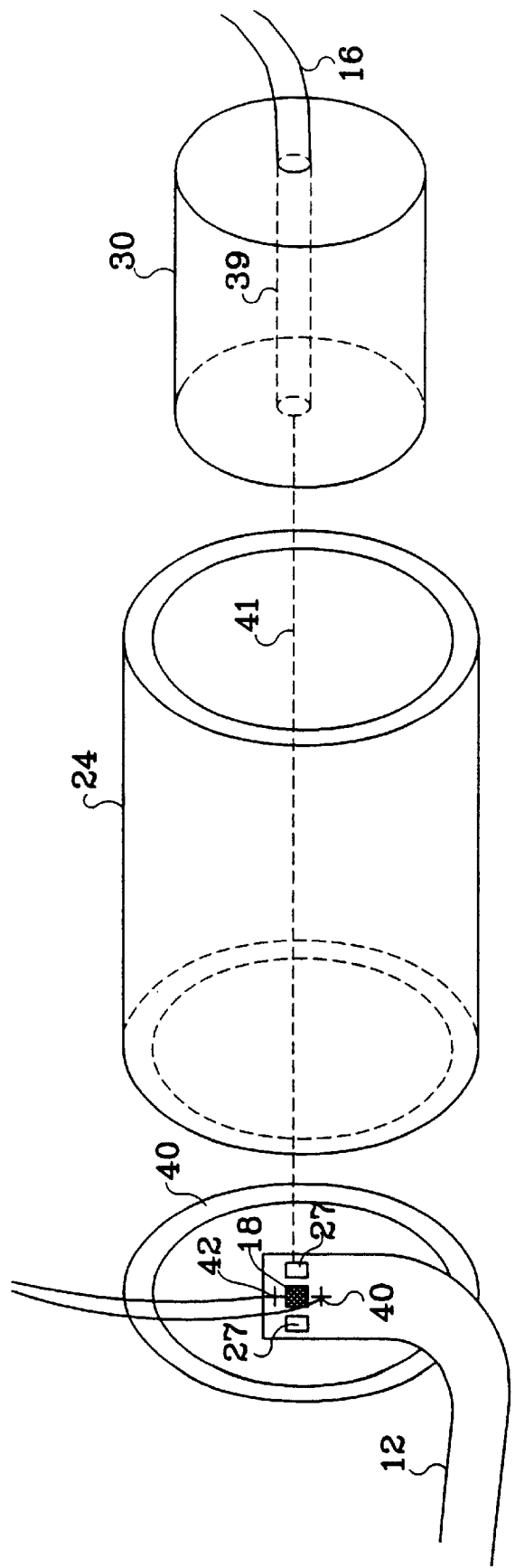
FIG. 4 shows an approach using visual alignment marks for positioning a flexible waveguide in an optical fiber connector receptacle.

FIG. 4 shows another embodiment for the connector which provides a sleeve type connection between flex circuit 12 and fiber 16. Fiber 16 is inserted with a hole 39 which may be slightly tapered with the larger diameter at the end where the fiber is inserted so as to ease the insertion of fiber 16 into hole 39. As fiber 16 is inserted the tapering of hole 39 this causes fiber 16 to enter into a tight fit in hole 39 as it approaches the other end of ferrule 30. An epoxy may be applied at the end where fiber 16 enters hole 39 on ferrule 30 to secure fiber 16 to ferrule 30. Ferrule 30 is fit into sleeve or connector receptacle 24 to where the ends of fiber 16 and ferrule 30 are at the other end of sleeve or connector receptacle 24. The end with 45-degree mirror 18 of flex circuit 12 is attached to a piece 40 that fits on the end of sleeve 24 like a cap. The metalized 45-degree facet mirror 18 is centered on the receptacle 24 center so it is aligned with the end of fiber 16 along axis or alignment line 41. Alignment grooves or slots 27 are not used at that end. Alignment marks 42 allow for manual or machine vision alignment of mirror 18 with the center of receptacle 24 and thus to the end of fiber 16.

FIGS. 5a and 5b show plane and lateral views of flex circuit 12 for the embodiment having 45-degree facets for mirror 18 on both ends. An ULTEM waveguide is enclosed by BCB clads 31. At both ends are visual alignment marks 42 used for aligning mirrors 18 to other optical devices 19 or 22, waveguides 20, mirrors 18 or fibers 16.

Figure 6C:
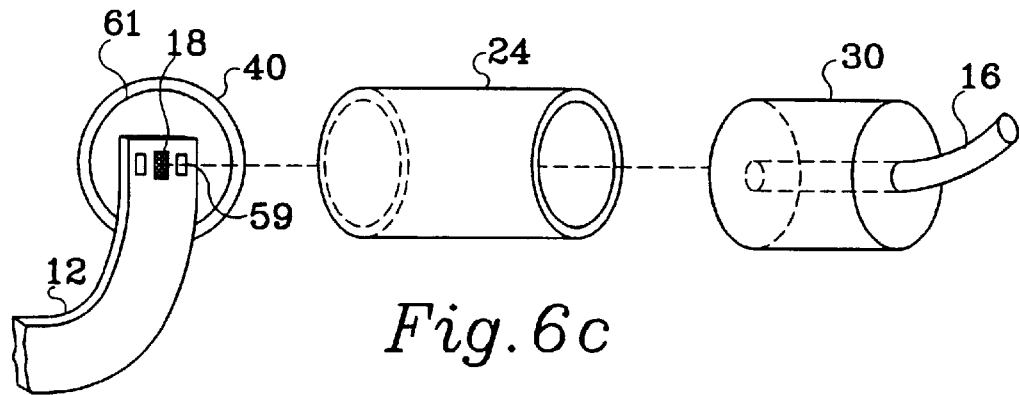
Figure 6D:
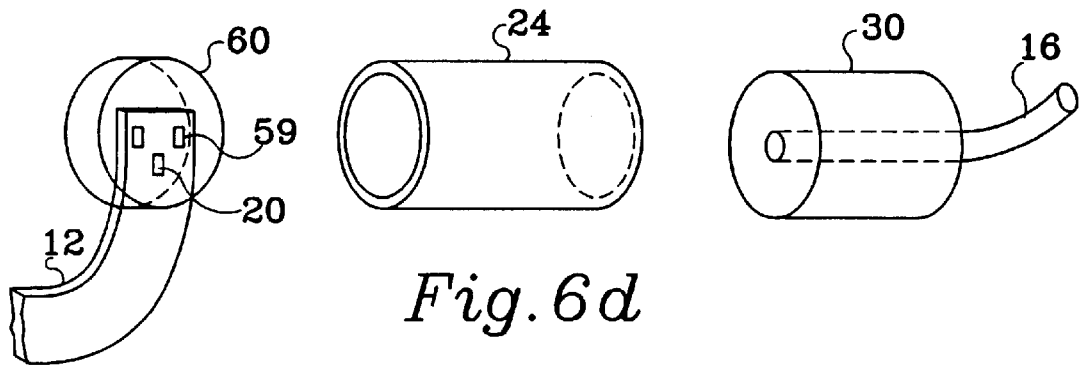
Figure 6E:
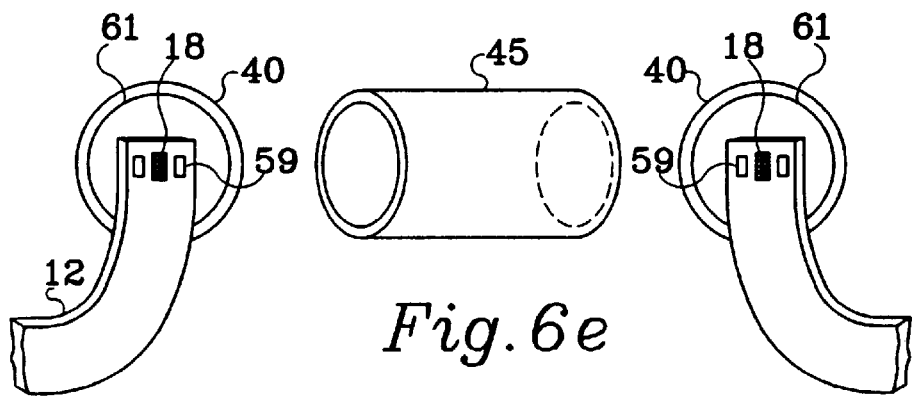
Figure 6F:
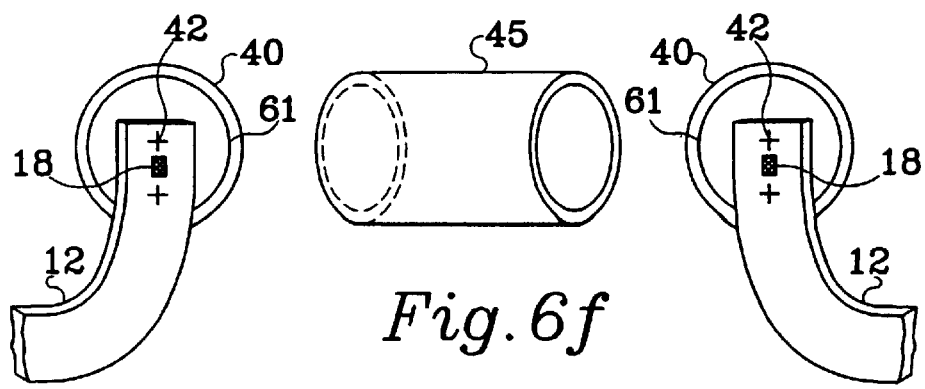

In FIGS. 6a through 6f, connections of various combinations of flexible waveguides and/or optical fibers, having optical or mechanical alignment, are illustrated. In FIGS. 6a, 6e and 6f, a flex waveguide circuit 12 may be attached to another flex waveguide circuit 12 via receptacle 25 and sleeve 45. In FIG. 6a, alignment slots or keys 47 are at the ends of plug 23 and receptacle 25. Plug 23 and receptacle 25 fit into sleeve 45 and are self-aligned with mechanical slots and keys 47, respectively.

FIG. 6b shows a waveguide 12 in plug 20 which is optically connected to an optical fiber 16 in receptacle 25. Waveguide 12 and fiber 16 are brought into optical alignment when plug 23 and receptacle 25 are inserted into sleeve 24 and to be proximate to each other.

FIG. 6c shows flex circuit 12 having waveguide 20 aligned mechanically to plate 40 via depressions 59 on circuit 20 which are mechanically aligned to pillars on plate 40. Edge 61 of plate 40 is mechanically aligned with the inside diameter sleeve 45. Plate 40 fits on sleeve 24 and ferrule 30 having fiber 16, is slipped into sleeve 24 and the end of fiber 16 is optically aligned with mirror 18 which reflects light to or from waveguide 20 in flex circuit 12 FIG. 6d shows flex circuit 12 having a lens 60. The depressions of circuit 12 are mechanically aligned with pillars on lens 60. Lens 60 is mechanically aligned and fitted to the inside diameter of sleeve 24. Ferrule 30 with fiber 16 is likewise mechanically aligned and fitted to the inside diameter of sleeve 24, thus resulting in the optical alignment of fiber 16 with waveguide 20 of the flex circuit 12.

FIG. 6e shows flex circuit 12 aligned with and attached to plate 40 like that in FIG. 6c. This flex circuit 12 is optically connected to another flex circuit 12 which is similarly aligned with and attached to a plate 40. The plates are attached to the respective ends of sleeve 45 whose inside diameter is mechanically aligned to edges 61 of plates 40, respectively, resulting in optical alignment of mirrors 18 of waveguides 20 of flex circuits 12. FIG. 6f reveals a similar interconnection of flex circuits 12 except instead of mechanical alignment of pillars and depressions 59 of circuit 12 to pillars on plate 40, there are visual alignment marks 42 which allow for either manual or machine vision alignment of flex circuit 12 to plate 40 such that when plates 40 are attached to sleeve 45, mirrors 18 will be optically aligned with each other.

FIG. 7 shows an interface device 15 for connecting fiber 16 to waveguide 20 of flex circuit 12. Fiber 16 is fit into ferrule 30. Ferrule 30 fits into receptacle 24 which is inserted into device 15. The end of fiber 16 is approximately flush with the surface of device 15 which mates with the 90-degree facet 21 of circuit 12. A hole 43 in device 15 and alignment marks or cross-hairs 48 on 90-degree facet 21 permit manual or machine vision alignment of the end of fiber 16 in device 15 with waveguide 20 of circuit 12 so that light can efficiently propagate between fiber 16 and waveguide 20.

Figure 8A:
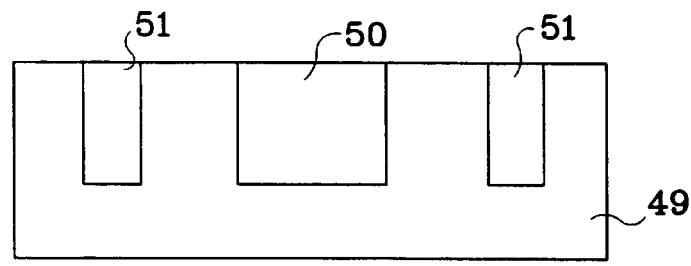
FIGS. 8a, 8b, 8c, 9a, 9b, 9c, 10a, 10b, 10c, 11a, 11b, 11c, 12a, 12b, 12c, 13a, 13b, 13c, 14a, 14b, 14c, 15a, 15b, 15c, 16a, 16b, 16c, 17a, 17b and 17c illustrate a process for fabricating a passively aligned flexible optical circuit.
Figure 8B:
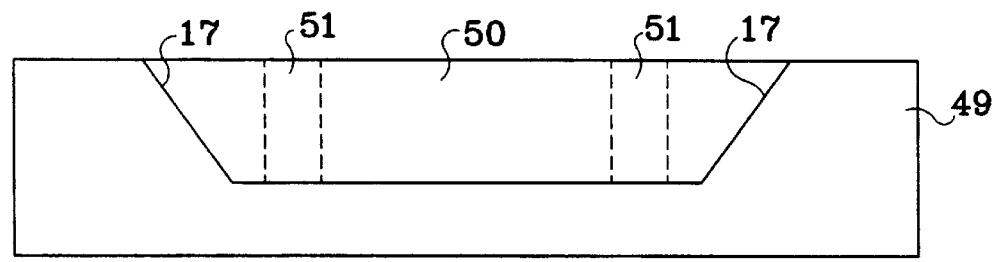
Figure 8C:
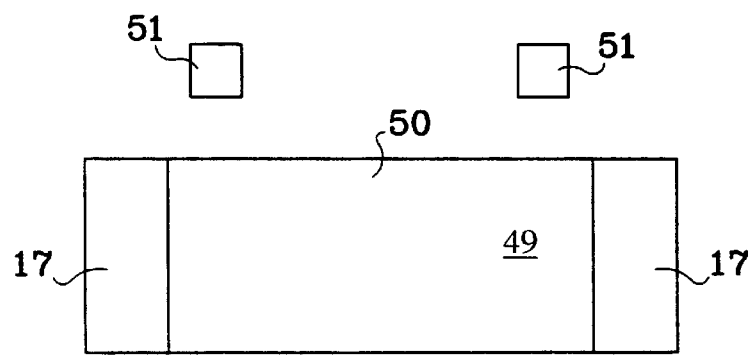

The following shows an example of fabrication of the subject invention. FIG. 8a shows a silicon die 49 for casting an ULTEM waveguide core 20 in trench-like space 50. Die 49 may be made of other materials, i.e., various metals rather than silicon. ULTEM is a General Electric (GE) plastic-like polyetherimide which is a liquid-type of substance used for injection molding. On each side of space 50 are smaller trenches 51. Trenches 51 create raised fudicial marks when injected with ULTEM. FIG. 8b is a side view which shows 45-degree folds, slants or cuts 17 in trench 50 for waveguide 20.

Figure 9A:
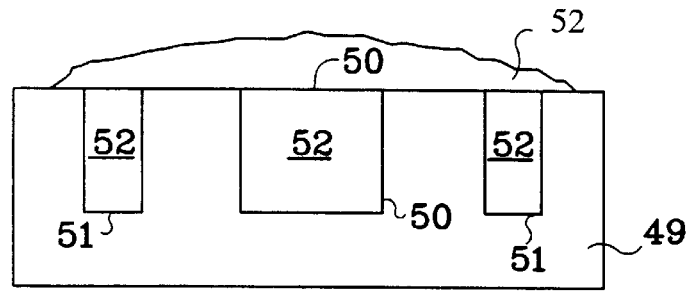
Figure 9B:
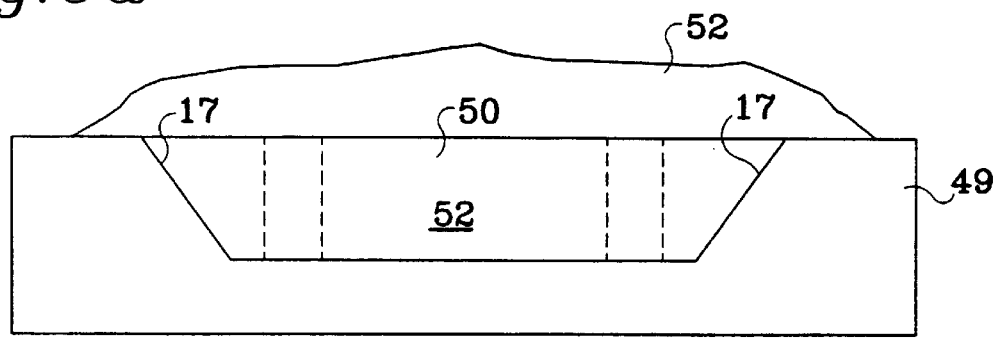
Figure 9C:
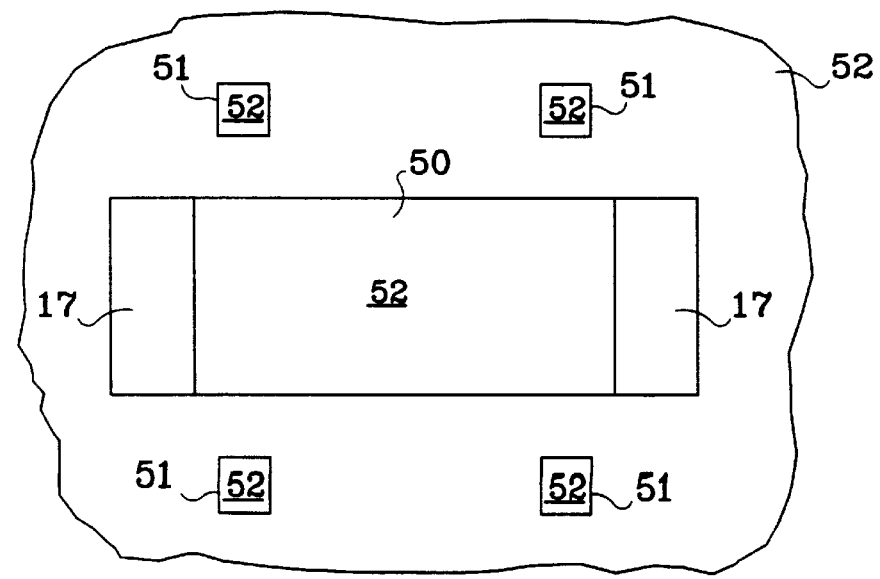
Figure 10A:
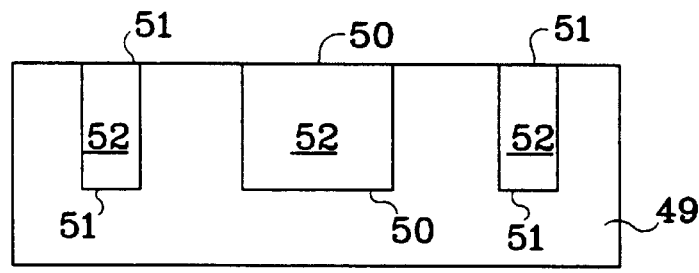
Figure 10B:
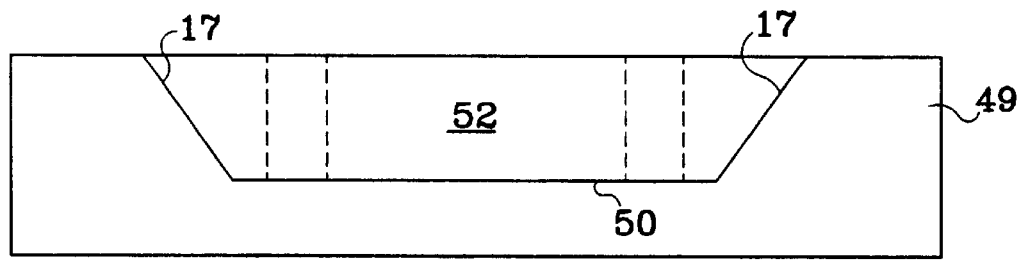
Figure 10C:
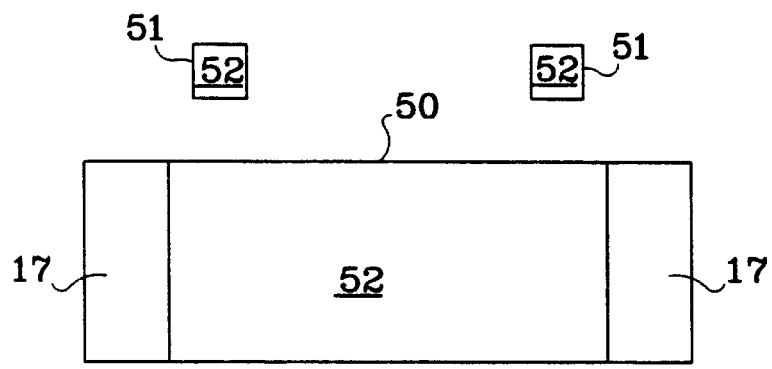
Figure 11A:
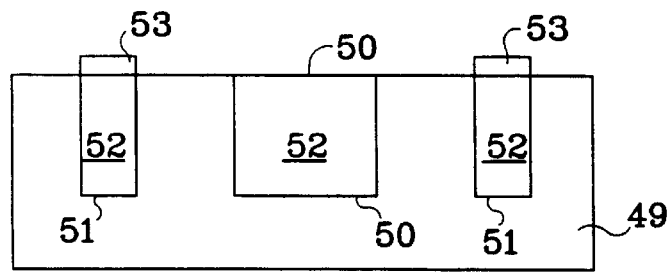
Figure 11B:
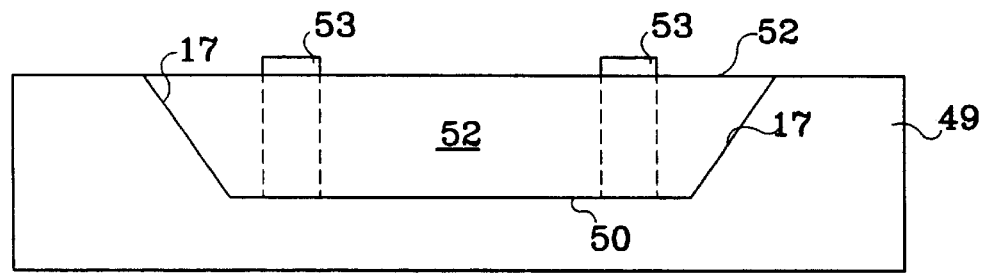
Figure 11C:
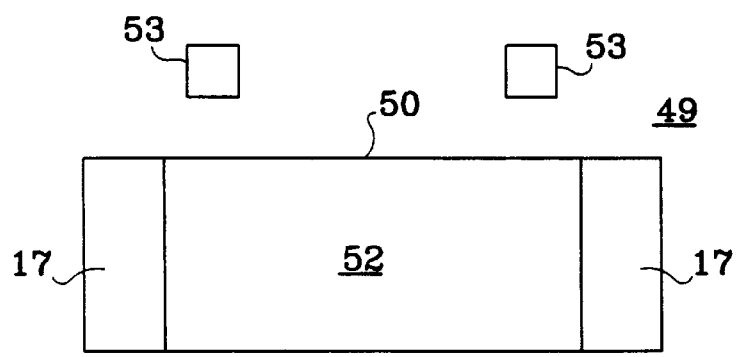

ULTEM material 52, or other equivalent material, is inserted into trenches 50 and 51, and overfilled as illustrated in FIGS. 9a, 9b and 9c. A "syringe" technique may be used for inserting material 52. Die 49 with material 52 applied is put in a chamber which is subjected to an environment of $N_2$ at a pressure between 0.05 and 0.1 atmosphere. ULTEM material 52 is cured at a temperature between 350 and 400 degrees Centigrade (C.). After the cure, the excess or footing of material 52 is removed with sandpaper, from coarse to fine. The removal of the excess material 52 may be instead removed with a diamond machine or metalinechloride vapor polishing. FIGS. 10a, 10b and 10c show the results after the removal of excess material 52 in that the new surface of material 52 in trenches 50 and 51 is even or matches up with the surfaces of die 49. A mask (not shown) is formed over die 49 and material 52 to form or deposit metal on material 52 in trenches 51 and the mask for masking fudicial marks for alignment purposes or a mechanical key. The mask is then removed with just metal 53 remaining on material 52 in trenches 51.

Figure 12A:
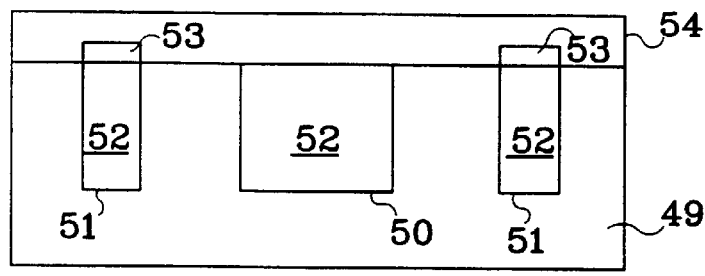
Figure 12B:
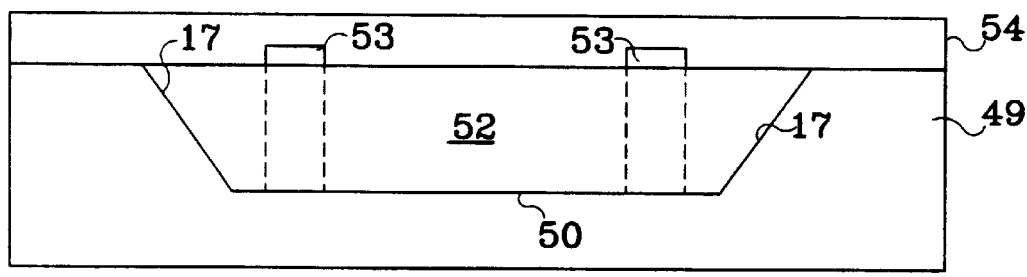
Figure 12C:
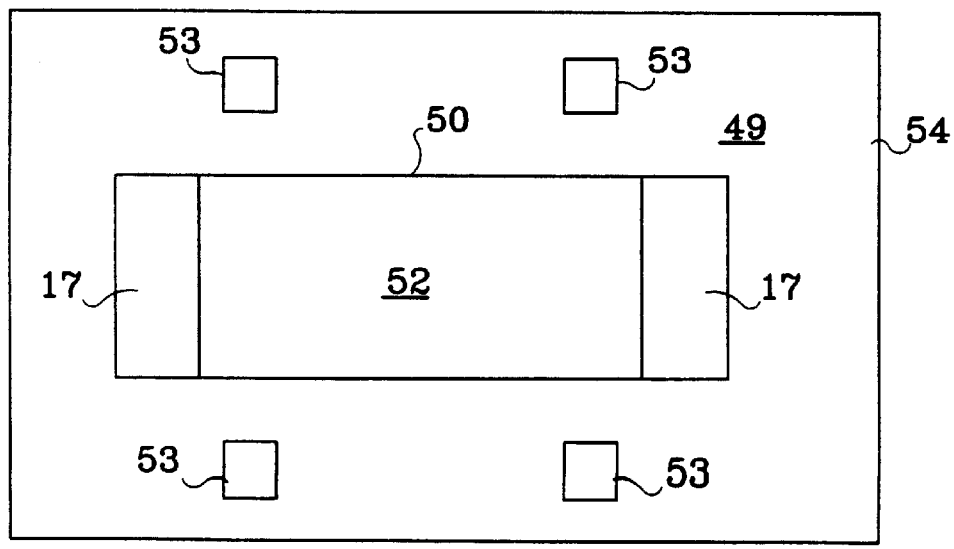
Figure 13A:
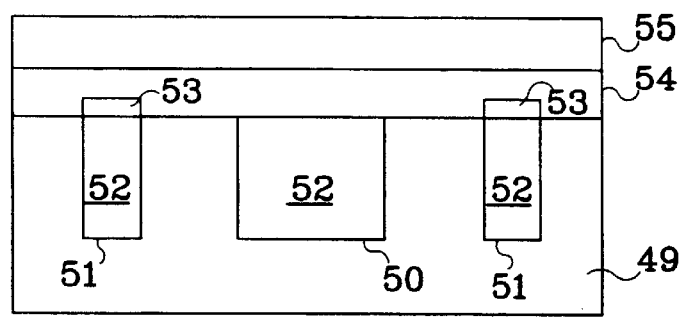
Figure 13B:
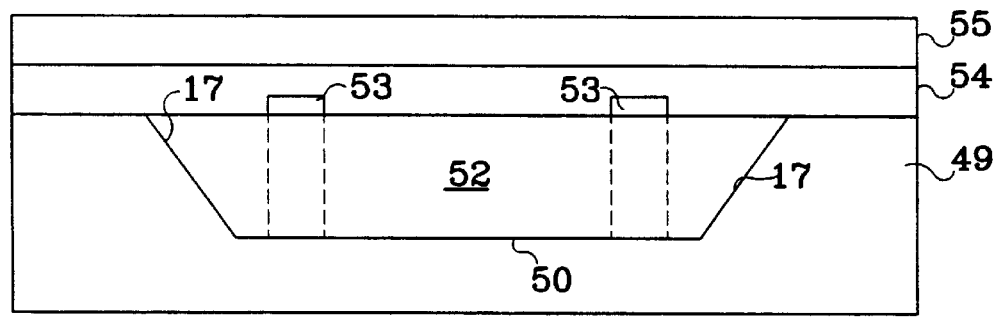
Figure 13C:
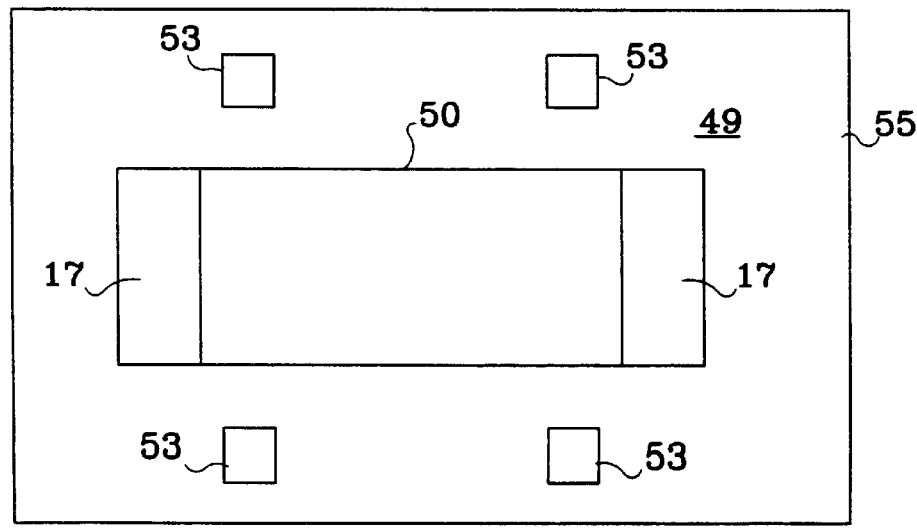

In FIGS. 12a, 12b and 12c, a cladding layer may be formed on the "top" surfaces of die 49, on and about metal fudicial marks 53, and on top of ULTEM 52 of waveguide 20. Cladding layer 54 is a Dow Chemical Inc. BCB (benzocyclobutene) which is a commercial liquid product that is spun on and thermally cured. Cladding 54 has a lower index of refraction than waveguide 20 and is used to confine light transmission to waveguide 20. In FIGS. 13a, 13b and 13c, ULTEM layer 55 is formed on cladding layer 54. Layer 55 is a carrier or back layer for BCB layer 54. Layer 55 provides ruggedness and mechanical stability and is a handle. Layer 55 is cured at 210 degrees C.

Figure 14A:
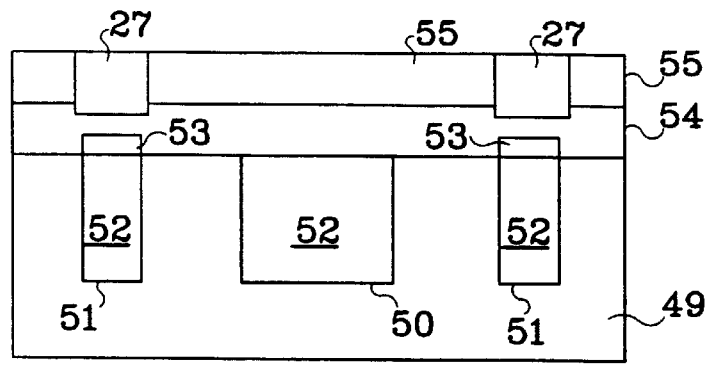
Figure 14B:
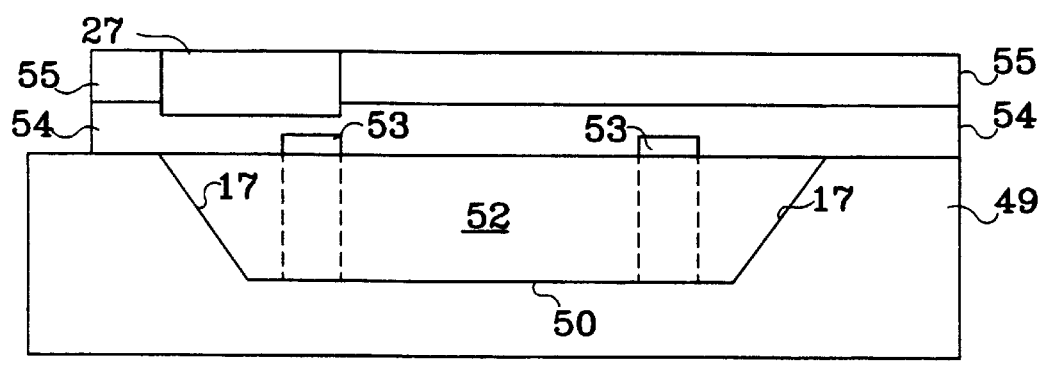
Figure 14C:
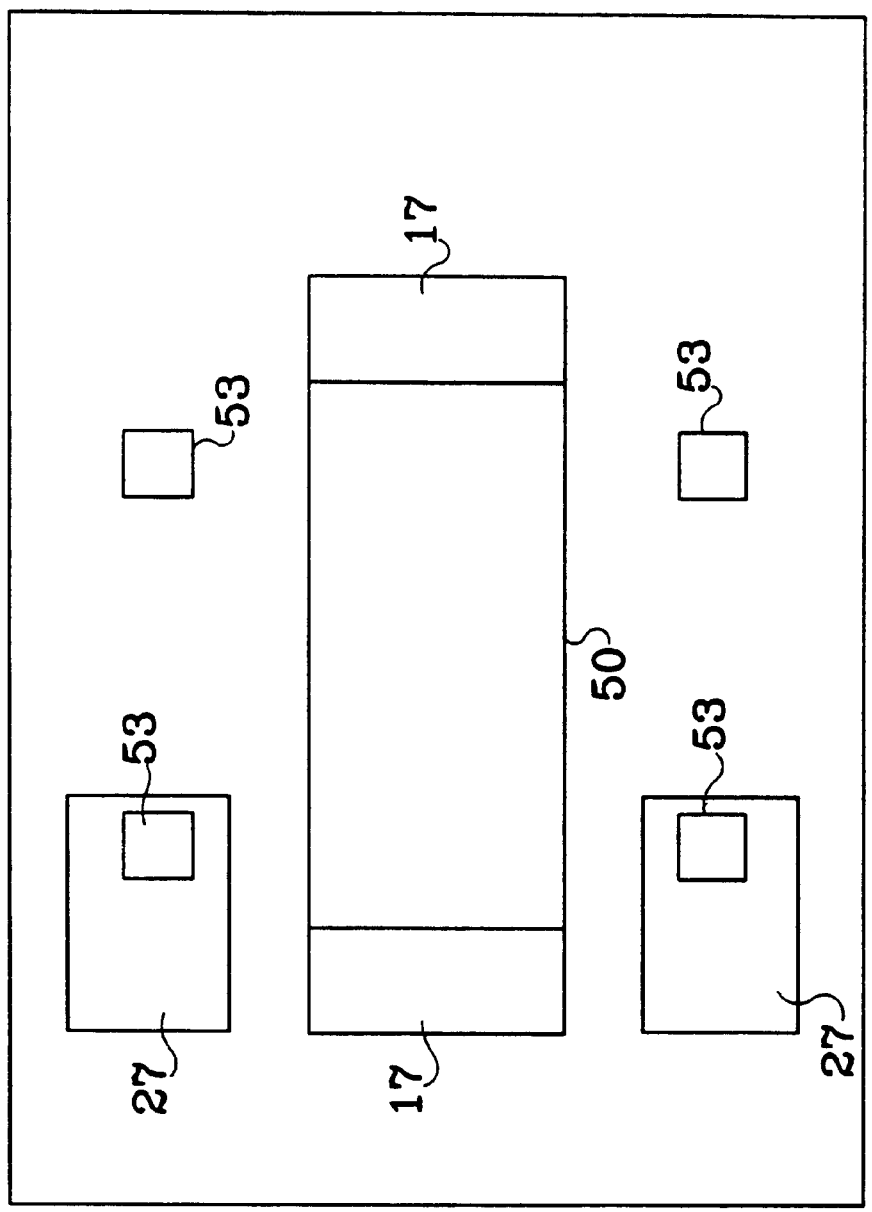

FIGS. 14a, 14b and 14c show the fabrication of alignment keys 27 with a RIA (reactive ion agent) etchant (SF6). Keys 27 are etched in ULTEM layer 55 and BCB layer 54. Key photoresist masks (not shown) are placed over layer 55 and are aligned according to metalized fudicial marks 53. Then keys 27 are formed via etching resulting in keys 27 aligned with marks 53.

Figure 15A:
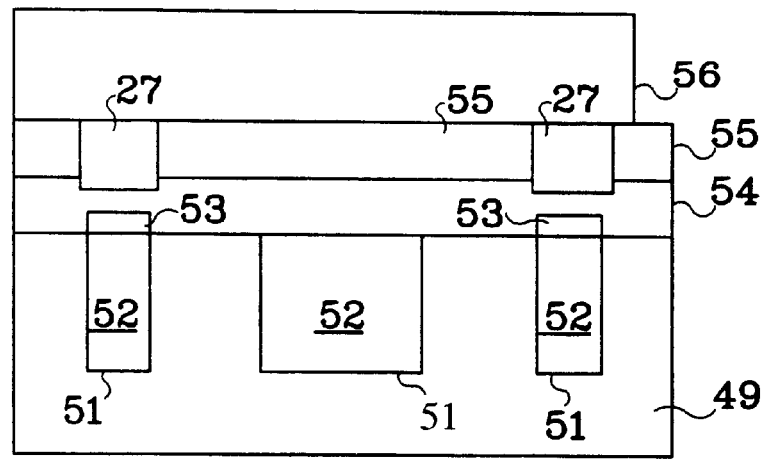
Figure 15B:
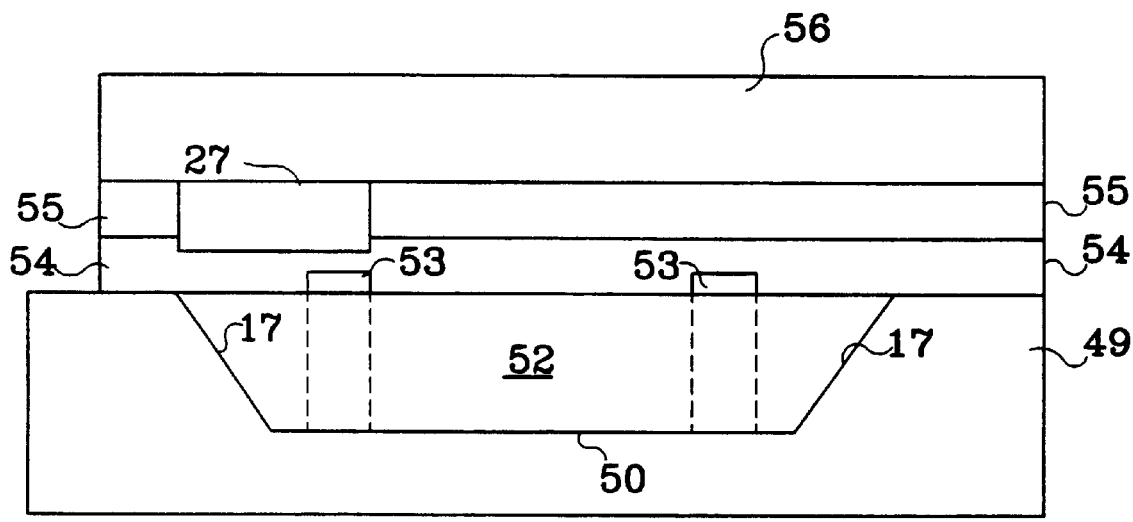
Figure 15C:
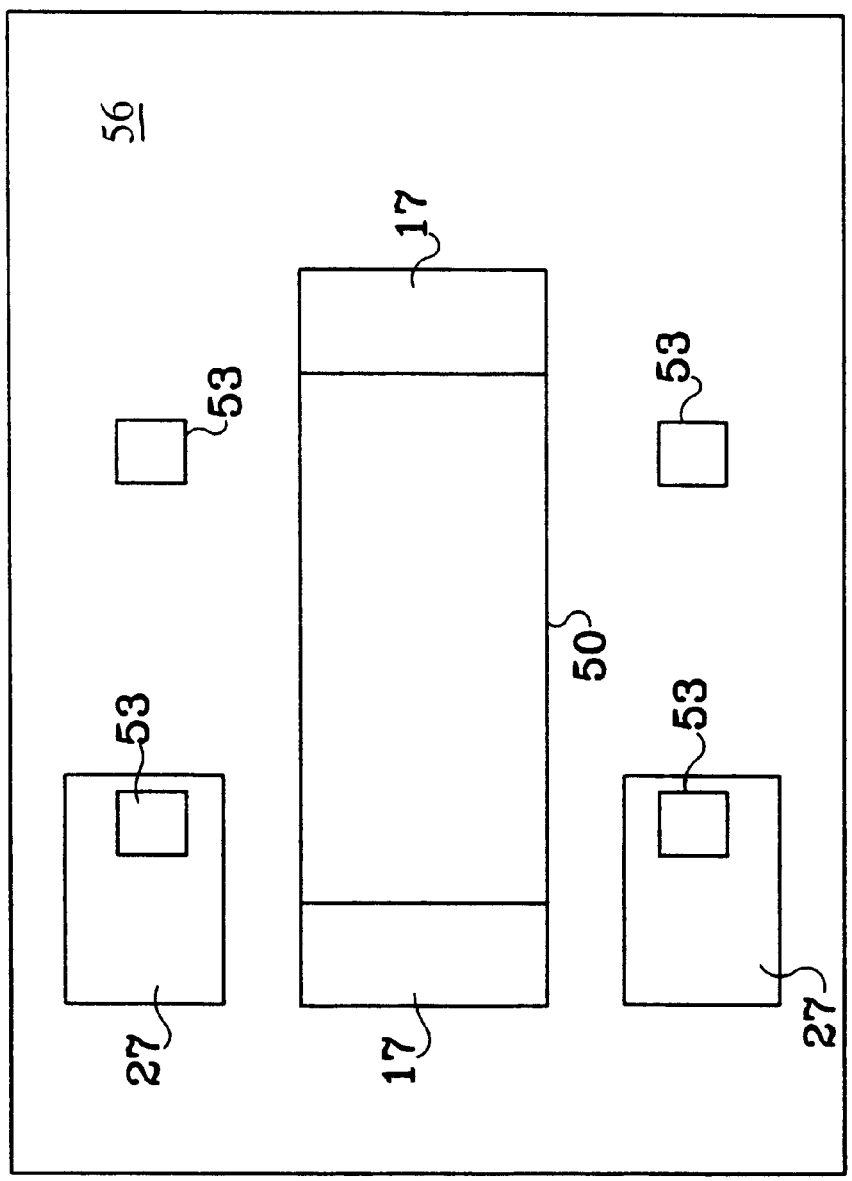
Figure 16A:
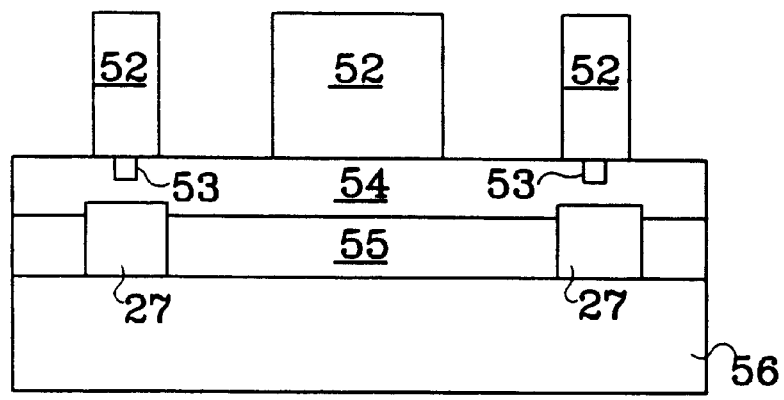
Figure 16B:
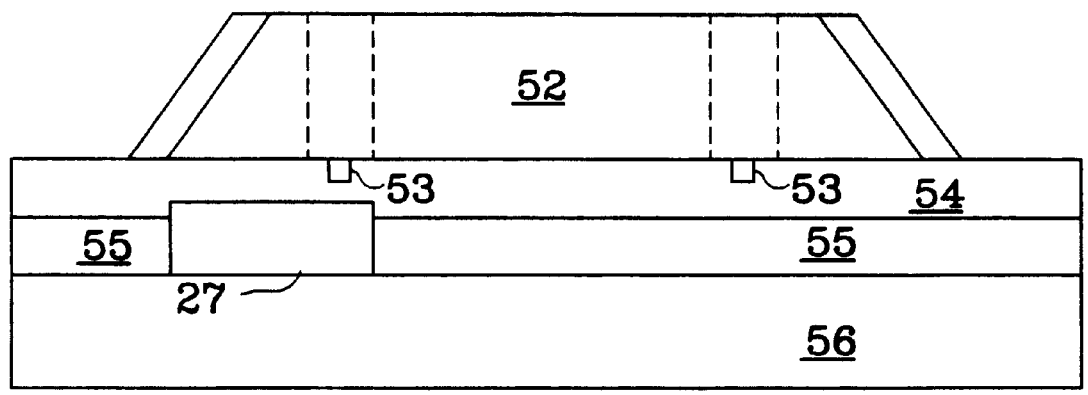
Figure 16C:
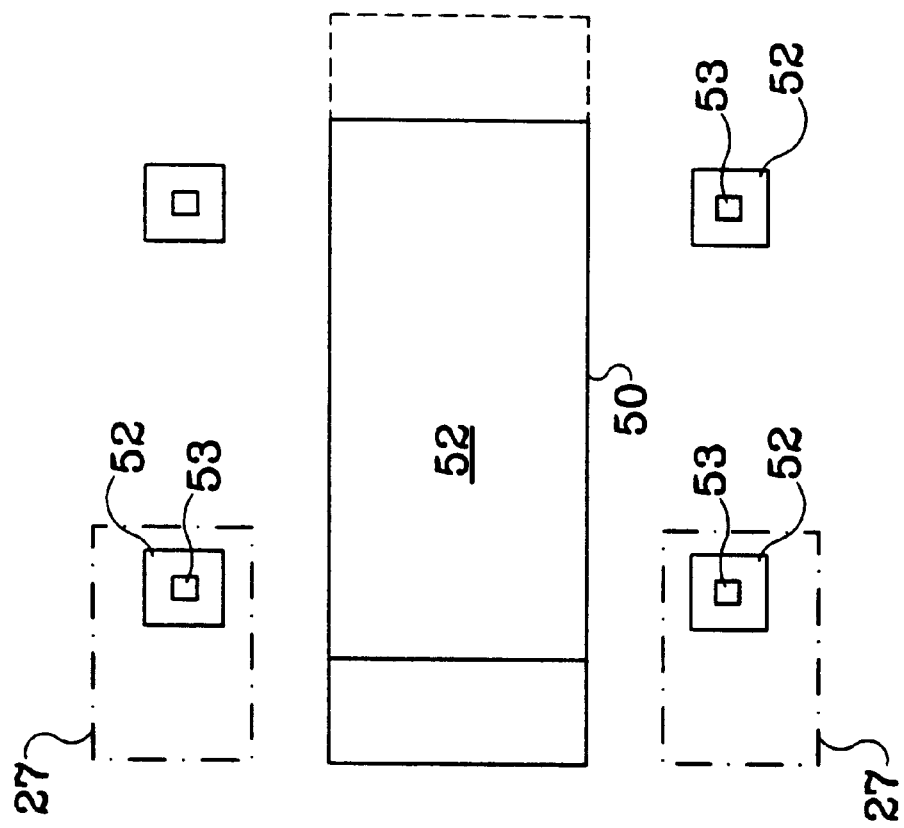

Quartz carrier 56 in FIGS. 15a, 15b and 15c, is put on ULTEM back or carrier layer 55 via an adhesion technique. Quartz carrier 56 is already fabricated and polished before it is attached to carrier 55. FIGS. 16a and 16b are effectively FIGS. 15a and 15b, flipped upside down, having silicon die 49 removed from ULTEM material 52 which formed waveguide 52 in trench 50 and material 52 formed by trenches 51 of die 49. The assembly of FIGS. 15a, 15b and 15c is put in a pressure cooker to effect the release of silicon master die 49 from the remaining assembly as shown in FIGS. 16a, 16b and 16c.

Figure 17A:
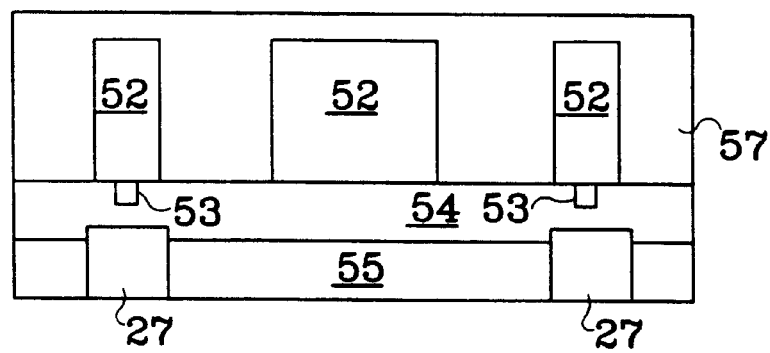
Figure 17B:
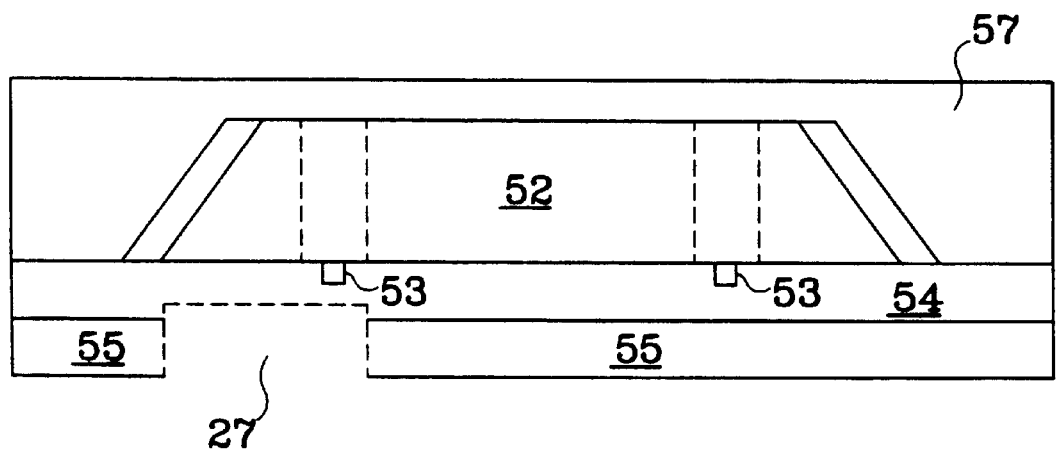
Figure 17C:
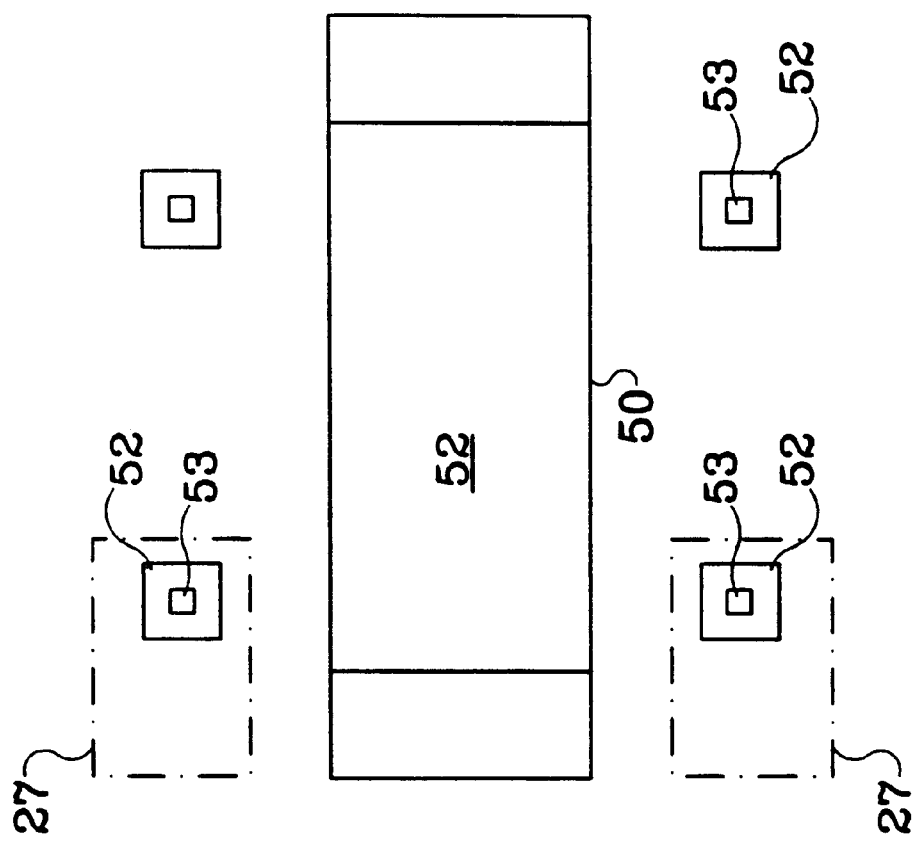

Metalized mirrors 18 are formed on portion of cuts or surfaces 17. A metal such as gold or aluminum is formed on cuts or surfaces 17 to result in metalized fold mirrors 18. A photoresist mask (not shown) is formed on the assembly of FIGS. 16a, 16b and 16c, such that only the areas of surfaces 17 to be used for mirrors 18 are exposed for the ensuing deposition of the metal. In FIGS. 17a, 17b and 17c, a final BCB cladding layer 57 is formed on ULTEM material 52, waveguide 20, mirrors 18 and ULTEM material 52. Then quartz carrier 56 is released and removed from ULTEM back layer 55. Thus, one has an example of a fabricated flex circuit 12.

Figure 18A:
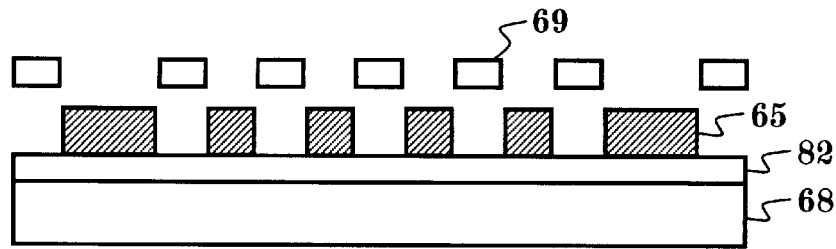
FIGS. 18a–18e reveal process steps for fabricating a flexible coupler having self-alignment keys.
Figure 18B:
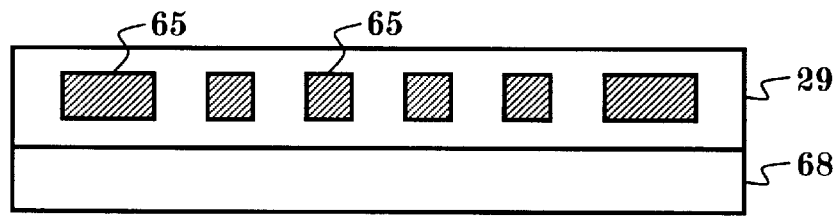
Figure 18C:
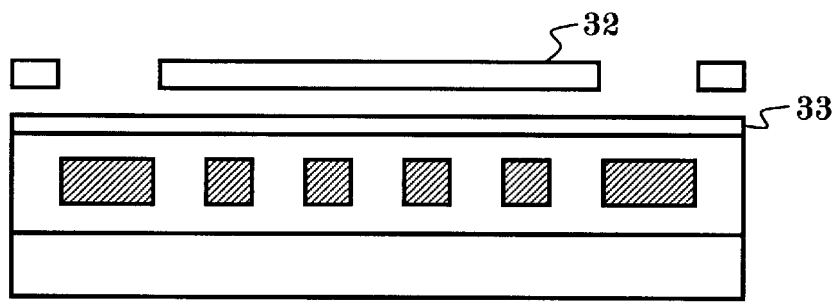
Figure 18D:
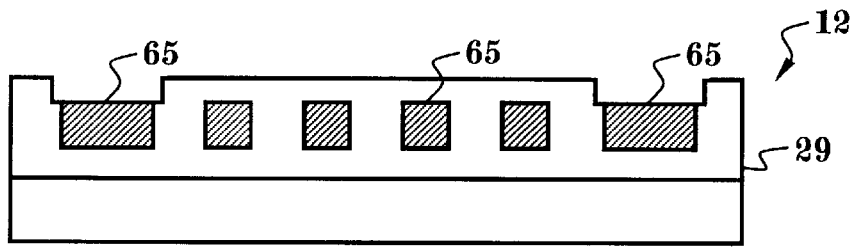
Figure 18E:
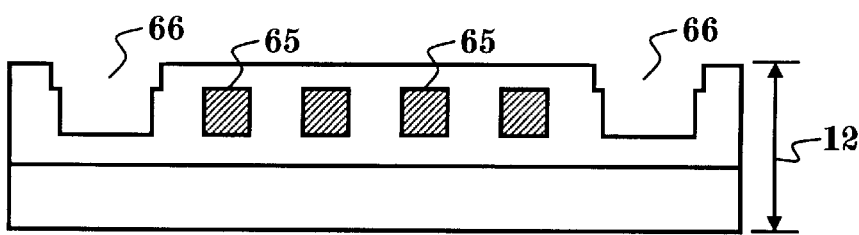

FIGS. 18a–18e show another process sequence which may be used to produce flex circuit or flexible polymer waveguide ribbon 12. A waveguide 65 layer may be deposited and photolithographically defined on a low refractive index cladding buffer layer 82, which in turn is deposited on a flexible polymer substrate 68. Wide regions of waveguide core 65 are defined adjacent to the waveguide array using a single mask level 69 in FIG. 18a. Waveguides 65 are buried using a cladding polymer 29, the same as that of layer 82, to yield a composite waveguide system with a core refractive index higher than that of cladding 29, and with additional buried wide regions of waveguide 65 core material in FIG. 18b. Next, in FIG. 18c, a second mask level 32 is used to expose resist 33 in an area slightly wider than the wide core 65 regions. Resist 33 is exposed using a non-critical alignment step. A non-selective light etch (e.g., $O_2+CF_4$ RIE) which attacks both core 65 and cladding materials 29 is used to remove the upper regions of multilayer system 12, exposing the waveguide core 65 material in the previously defined regions where slots 66 are to be located, as illustrated in FIG. 18d. Next a selective etch ($O_2$ RIE only) is used to remove the waveguide core 65 material in the same regions to form slots or grooves 66, as shown in FIG. 18e. Resulting grooves 66 are of a width defined by first level mask 69, and thus the alignment steps are automatically aligned with respect to waveguide cores 65 located at the outside edges.

Figure 19:
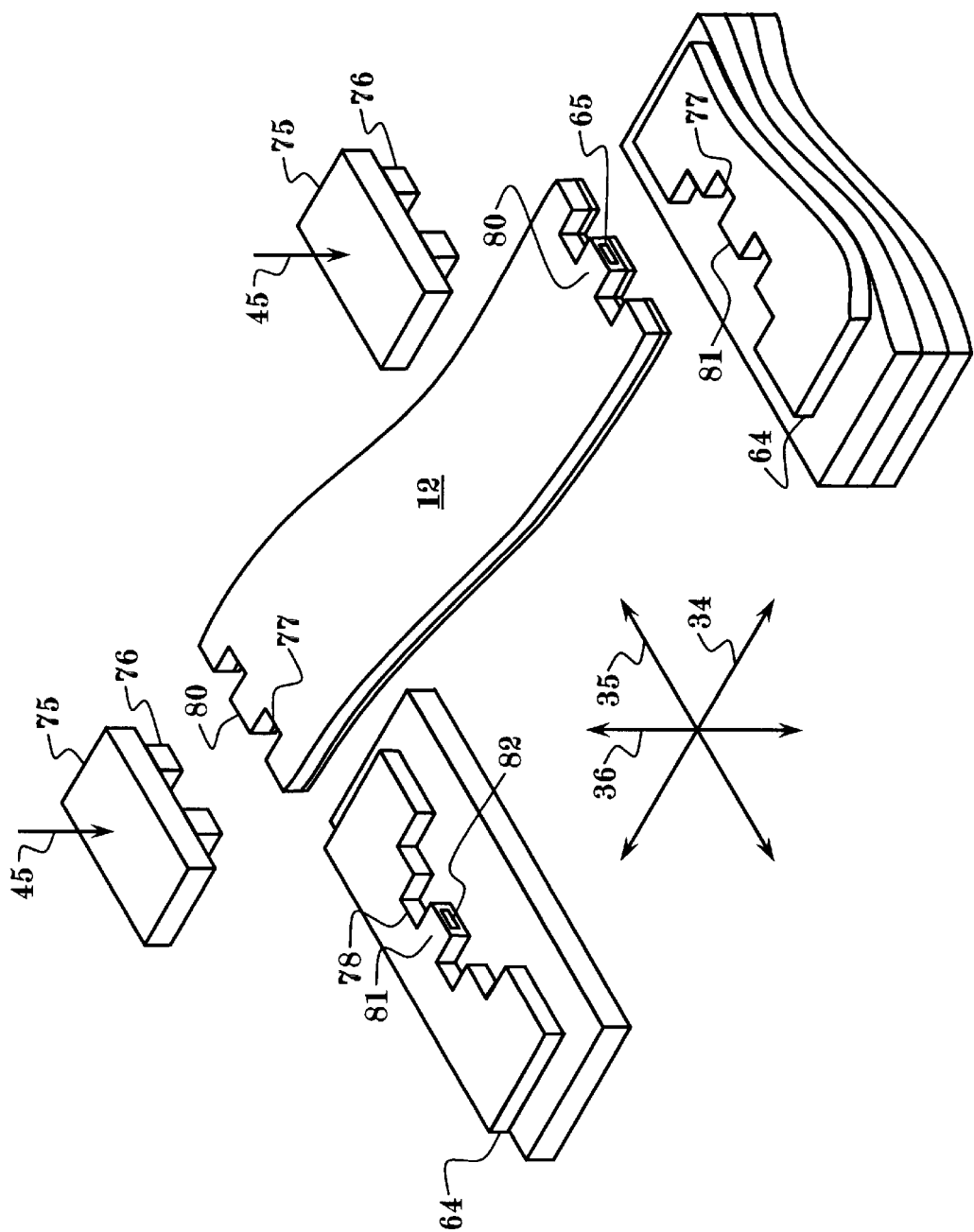
FIG. 19 shows the alignment of a flexible coupler secure with rigid keys.

In another embodiment, a rigid "key" 75 having mirror image protrusions to grooves or slots 66 and possibly formed with the same mask, is fabricated using a rigid substrate and defining polymer ribs (FIG. 19). Key 75 may be used to align the various selections of waveguide 12 providing a complete interconnect. Key 75 is moved across surfaces 80 and 81 at the interconnect location until ribs 76 register with the grooves or slots 77 and 78. At least one groove or slot 78 may also be fabricated from the same mask as grooves or slots 77 so as to provide alignment between waveguides 65 and 82 of less than 5 micrometers ($\mu$m). Similarly, one or several grooves or slots may fabricated to facilitate alignment between waveguide 65 and waveguide 82. Downward pressure 45 is used to align waveguide cores 65 and 82, and insert key 75 with ribs 76 into slots 77 and 78 to interlock flex coupler 12 to board or chip 64. One of a number of different adhesives can be used to cover and glue the interlocking parts together in a permanent manner. A second section of waveguide 65 can be aligned to a first section of waveguide 82 by sliding the two components together using key 75 to define lateral alignments 34 and 35 and vertical alignment 36, and interlock the components in an aligned fashion.

Self-alignment with respect to the waveguides 65 and 82 may also be obtained by the automatic positioning of two parts (a board or chip 64 and a flexible waveguide 12) using previously defined steps or features. This type of automatic positioning is an important part of a backplane approach; however, the process of defining the steps or features is still costly. The present invention as to a 'self-aligning connector" uses the term "self-aligning" to describe the process by which the alignment features 66 and 78 are made in the connector components 12 and 64 using unique selective etch features of the waveguide 65 system. There is no need for any mask registration. The two-polymer system makes this approach possible as noted above. The impact of this idea is applicable to optical backplanes at the system level. The self-aligning process allows simple fabrication of the self-aligning connector assemblies 75, 77 and 78.

What is claimed is:

1. A self-aligned optical coupler for optically connecting devices, comprising:
    a flexible waveguide ribbon having first and second ports, comprising:
        a strip of a flexible substrate;
        a first layer having a first refractive index, formed on said strip;
        at least one waveguide having a second refractive index, formed on a first portion of said first layer; and
        a second layer having the first refractive index, formed on said at least one waveguide and second portion of said first layer;
    a first alignment structure formed by an etching process into the flexible waveguide ribbon proximate to the first port of said waveguide ribbon, for providing alignment in at least two dimensions relative to a first optical device on a support mechanism;
    a second alignment structure formed on the support mechanism, for mating with the first alignment structure and providing aligmnent between the first port and the first optical device; and
    an adhesive formed on the waveguide ribbon and the support mechanism proximate to the first port and the first optical device to secure the alignment and connection between the first port and first optical device.

2. The self-aligned optical coupler of claim 1, wherein:
    said at least one waveguide has the first port beveled at an angle between 35 and 55 degrees relative to a direction of a longest dimension of said waveguide; and
    a reflective material is formed on the beveled first port for receiving or sending light from or to the first optical device having a port at an angle relative to the direction of the longest dimension of the first optical device.

3. The self-aligned optical coupler of claim 2, wherein the first optical device is a vertical cavity surface emitting laser (VCSEL).

4. The self-aligned optical coupler of claim 2, wherein:
    said at least one waveguide is fabricated from a polyetherimide material; and
    said first and second layers are fabricated from a benzocyclobutene material.

5. The self-aligned optical coupler of claim 4, wherein said adhesive is a glob of dark epoxy.

6. The self-aligned optical coupler of claim 1, further including a key used to align said first alignment structure and said second alignment structure in at least one dimension.

7. A self-aligned optical flexible coupler comprising:
    a flexible optical waveguide having first and second ports at its respective ends and at least one alignment feature selectively etched into the waveguide;
    a flexible cladding surrounding said flexible optical waveguide;

a first alignment mark on said cladding proximate to the first port;

a second alignment mark on a support mechanism proximate to an optical device; and wherein said first and second alignment marks are aligned with machine vision techniques, such that the first port is aligned with the optical device;

wherein a glob of adhesive is formed on the end of the optical waveguide to secure the alignment of the first port with the optical device; and wherein the refractive index of the cladding is lower than the refractive index of the optical waveguide.

8. The self-aligned optical coupler of claim 7, wherein:

the first port is beveled at an angle between 30 and 60 degrees relative to a direction of a longest dimension of said optical waveguide; and a reflective material is formed on the beveled first port.

9. The self-aligned optical coupler of claim 8, wherein:

said flexible optical waveguide is fabricated from a polyetherimide material; and said flexible cladding is fabricated from a benzocyclobutene material.

10. The self-aligned optical coupler of claim 9, wherein the glob of adhesive is dark epoxy.

11. The self-aligned optical coupler of claim 8 wherein the optical device is at least one vertical cavity surface emitting laser (VCSEL).

12. The self-aligned optical coupler of claim 7, further including a key used to align said first alignment mark and said second alignment mark in at least one dimension.

* * * * *